United States Patent
Fernihough

(10) Patent No.: US 12,461,265 B2
(45) Date of Patent: Nov. 4, 2025

(54) SEISMIC DATA ACQUISITION WITH EXTENDED DYNAMIC RANGE

(71) Applicant: PGS Geophysical AS, Oslo (NO)

(72) Inventor: Robert Alexis Peregrin Fernihough, Georgetown, TX (US)

(73) Assignee: PGS Geophysical AS, Oslo (NO)

( * ) Notice: Subject to any disclaimer, the term of this patent is extended or adjusted under 35 U.S.C. 154(b) by 232 days.

(21) Appl. No.: 17/991,301

(22) Filed: Nov. 21, 2022

(65) Prior Publication Data
US 2023/0194742 A1 Jun. 22, 2023

Related U.S. Application Data

(60) Provisional application No. 63/290,477, filed on Dec. 16, 2021.

(51) Int. Cl.
*G01V 1/38* (2006.01)
*G01V 1/18* (2006.01)

(52) U.S. Cl.
CPC ............ *G01V 1/3843* (2013.01); *G01V 1/186* (2013.01); *G01V 2210/1293* (2013.01); *G01V 2210/1423* (2013.01)

(58) Field of Classification Search
CPC .............. G01V 1/3843; G01V 1/186; G01V 2210/1293; G01V 2210/1423; G01V 1/243; G01V 1/245
See application file for complete search history.

(56) References Cited

U.S. PATENT DOCUMENTS

| | | | |
|---|---|---|---|
| 3,887,897 A * | 6/1975 | Neitzel | G01V 1/20 367/20 |
| 4,321,675 A | 3/1982 | Harris et al. | |
| 4,384,364 A | 5/1983 | Henning | |
| 4,706,226 A * | 11/1987 | Houghtaling | G01V 1/245 367/66 |

(Continued)

FOREIGN PATENT DOCUMENTS

| | | |
|---|---|---|
| EP | 2291681 B1 | 8/2015 |
| WO | 2014012362 A1 | 1/2014 |
| WO | 2021166946 A1 | 8/2021 |

OTHER PUBLICATIONS

Search Report in EP22211139, dated Apr. 28, 2023, 5 pages.
(Continued)

*Primary Examiner* — Yuqing Xiao
*Assistant Examiner* — Christopher Richard Walker

(57) ABSTRACT

A marine seismic data acquisition system may include first and second containers deployable in a body of water. The first container includes a first seismic data acquisition channel capable of transducing seismic energy in the body of water having a first maximum amplitude, and the second container includes a second seismic data acquisition channel capable of transducing seismic energy in the body of water having a second maximum amplitude. The first seismic data acquisition channel is associated with at least a first seismic sensor, and the second seismic data acquisition channel is associated with at least a second seismic sensor. The second (Continued)

sensor corresponds to a same sensor type as the first seismic sensor, and the first maximum amplitude is higher than the second maximum amplitude.

17 Claims, 16 Drawing Sheets

(56) References Cited

U.S. PATENT DOCUMENTS

| | | | |
|---|---|---|---|
| 4,967,400 A * | 10/1990 | Woods | G01V 1/22 367/78 |
| 5,408,442 A | 4/1995 | Hepp | |
| 5,625,348 A * | 4/1997 | Farnsworth | G01V 1/01 702/14 |
| 6,246,322 B1 * | 6/2001 | LeDain | G01V 1/001 340/384.1 |
| 7,453,763 B2 | 11/2008 | Johnstad | |
| 8,710,845 B2 | 4/2014 | Lindqvist et al. | |
| 8,816,690 B2 | 8/2014 | Sudow et al. | |
| 9,341,732 B2 | 5/2016 | Edwards et al. | |
| 9,598,954 B1 * | 3/2017 | Zhang | E21B 47/092 |
| 9,766,281 B2 | 9/2017 | Sellin | |
| 9,915,743 B2 | 3/2018 | Sallas et al. | |
| 10,001,575 B2 | 6/2018 | Borresen et al. | |
| 10,073,183 B2 | 9/2018 | Hegna | |
| 10,139,505 B2 | 11/2018 | Tenghamn et al. | |
| 10,228,479 B2 * | 3/2019 | Bernitsas | G01V 1/38 |
| 10,371,845 B2 * | 8/2019 | Guillot, III | G01V 1/3835 |
| 10,461,523 B2 | 10/2019 | Heelan | |
| 10,962,667 B2 | 3/2021 | Iranpour | |
| 11,221,426 B2 | 1/2022 | Kumar et al. | |
| 2004/0139803 A1 * | 7/2004 | Robinson | G01H 11/06 73/650 |
| 2017/0299751 A1 * | 10/2017 | Chang | E21B 47/095 |
| 2018/0172856 A1 * | 6/2018 | Hillesund | G01V 1/201 |
| 2018/0324507 A1 * | 11/2018 | Tenghamn | H04R 1/02 |
| 2021/0063597 A1 | 3/2021 | Orji et al. | |

OTHER PUBLICATIONS

Vinje, et al., "Shooting Over the Seismic Spread," First Break, vol. 35, pp. 97-104 (Jun. 2017).
Transcript of "Sirius DualCoreADC Data Acquisition Technology with 160 dB Dynamic Range," as downloaded from https://www.youtube.com/watch?v=mzNyTn3W42s on May 3, 2023.
"Dewesoft Sirius Mini Portable 4-Channel Sound and Vibration Analyzer," as downloaded from https://dewesoft.com/products/sirius-mini on May 3, 2023.
Wege, et al., "Field and Synthetic Waveform Tests on Using Large-Offset Seismic Streamer Data to Derive Shallow Seabed Shear-Wave Velocity and Geotechnical Properties," Earth and Space Science, vol. 9, Issue 6 (AGU, Jun. 2022).
Zou, et al., "Temporal and Spatial Variations in Three-Dimensional Seismic Oceanography," Ocean Science, 17, pp. 1053-1066 (EGU/Copernicus Publications, Aug. 12, 2021).
Pei, et al., "Developemnt of a High-Resolution Deep-Towed Mutli-Channel Seismic Exploration System: Kuiyang ST2000," Journal of Applied Geophysics, vol. 198 (Elsevier, Mar. 2022).
Fairhurst, "Alternate Mark Inversion (AMI)," as downloaded from https://www.erg.abdn.ac.uk/users/gorry/course/phy-pages/ami.html on Apr. 28, 2025.
Texas Instruments, "LM146/LM346 Programmable Quad Operational Amplifiers" (Texas Instruments 2004).

* cited by examiner

SEISMIC DATA ACQUISITION WITH EXTENDED DYNAMIC RANGE

CROSS-REFERENCE TO RELATED APPLICATIONS

This application claims benefit to the filing date of U.S. Provisional Application 63/290,477, filed Dec. 16, 2021 ("the '477 Application"), the contents of which are hereby incorporated by reference as if entirely set forth herein. In the event of any conflict between usage of a term in the '477 Application and usage of the same term herein, the usage herein shall control.

BACKGROUND

During a typical marine seismic survey, one or more marine seismic sources are activated at intervals to produce acoustic energy that propagates through a body of water into a subsurface earth volume. The seismic sources used in such surveys often include impulsive devices such as air guns, but may also include non-impulsive devices such as marine vibrators. The acoustic energy produced by the source or sources penetrates layers of sediment and rock in the subsurface. As it does so, the energy encounters interfaces between materials having different physical characteristics, including different acoustic impedances. At each such interface, a portion of the acoustic energy is reflected upward, while another portion of the energy is refracted downward and continues toward the next lower interface. The reflected energy is detected by sensors—also referred to as receivers—that are disposed at intervals along the lengths of towed streamers, or in ocean bottom nodes or cables, or in a combination of these. The seismic reflections that are detected by the sensors are recorded for later use in a process known as seismic imaging, during which images of structures within the subsurface can be generated based on the recorded seismic reflection data. The images are used for a variety of purposes including, for example, to identify possible locations of hydrocarbon reservoirs within the subsurface or to assess possible locations for subsurface installations such as windmill farms.

In traditional seismic surveys, a significant distance exists between the source and the closest receiver such that the shortest offset measured in the survey may be several hundred meters in length. More recently, however, special purpose surveys have required the measurement of shorter offsets. For example, in shallow water surveys, it is desirable be able to record "zero" offsets—that is, to be able to record seismic reflections from points in the subsurface that are located vertically underneath the seismic source. It is also desirable in such surveys to be able to record "short" or "negative" offsets—that is, to be able to record reflections from points in the subsurface that are located perhaps just tens of meters behind the source or ahead of the source, respectively.

DETAILED DESCRIPTION

Terminology

Figure 1:
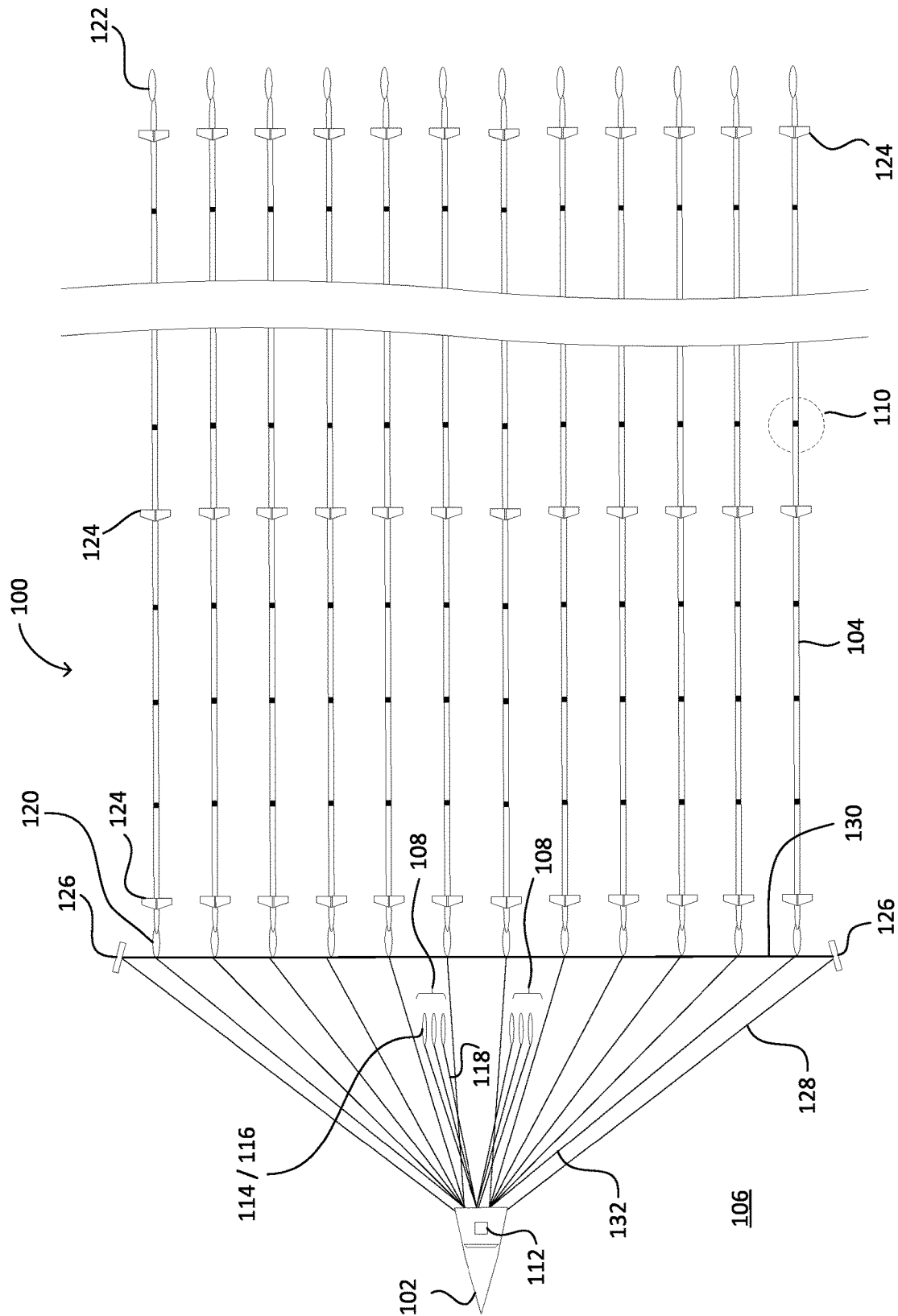
FIG. 1 is a top view of an example towed-streamer marine seismic survey system in accordance with embodiments.

This disclosure describes multiple embodiments by way of example and illustration. It is intended that characteristics and features of all described embodiments may be combined in any manner consistent with the teachings, suggestions, and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others.

The phrase "configured to" as used herein means that the referenced item, when operated, can perform the described function. In this sense, an item can be "configured to" perform a function even when the item is not operating and therefore is not currently performing the function. Use of the phrase "configured to" herein does not necessarily mean that the described item has been modified in some way relative to a previous state.

"Coupled" as used herein refers to a connection between items. Such a connection can be direct, or can be indirect, such as through connections with other intermediate items.

Terms used herein such as "having," "including," "comprising," and their variants, mean "including but not limited to." Articles of speech such as "a," "an," and "the" as used herein are intended to serve as singular as well as plural references except where the context clearly indicates otherwise.

"Fixed" as used herein with reference to a characteristic of an element means that the characteristic is not changed during the pendency of a given marine seismic survey.

The phrase "dynamic range" as used herein means, in relation to a component that can transduce an input signal, a ratio of the largest amplitude input signal the component can transduce to the smallest amplitude input signal the component can transduce.

The phrase "noise floor" as used herein means, in relation to a measuring system or a transducer system, the amplitude of the signal that is created in the system by the sum of all sources of noise, where noise is defined as any signal other than the one being monitored. In a marine seismic survey, the signal being monitored is an amplitude of seismic energy (typically, one or more seismic pressure waves in a body of water).

The word "transduce" and its variants as used herein refer to the conversion of an input signal (e.g., seismic energy in a body of water, or an electronic output of a seismic sensor) to a converted form, where the conversion is performed with sufficient accuracy and with sufficiently low noise that the converted form may be used as an input for seismic data processing (e.g., as an input to a seismic imaging process). For example, consider the case of a seismic data acquisition channel that converts seismic energy amplitudes sensed in a body of water into digital output values. The maximum positive and negative amplitudes of seismic energy that such a data acquisition channel can transduce are limited by the maximum positive and negative values that the digital output value can represent, after taking into account the scale at which the data acquisition channel represents the seismic energy amplitudes. The maximum and minimum values that such an output can represent are referred to as "saturation limits." Thus, when sensed seismic energy amplitudes equal or exceed the limits that a data acquisition channel is capable of representing at its output, the acquisition channel is said to be "saturated" because the input seismic energy levels equal or exceed the saturation limits of the acquisition channel. Seismic energy signals having amplitudes that exceed the saturation limits of a data acquisition channel would be inaccurately represented by the acquisition channel because all such signals would effectively be mapped to the same positive or negative maximum digital output values. The resulting inaccuracy would render the output values inappropriate for use in any seismic data processing that involves such large amplitude seismic energy signals. A data acquisition channel is therefore not capable of transducing input amplitudes that exceed its saturation limits. Similarly, the minimum positive and negative amplitudes of seismic energy that a seismic data acquisition channel can transduce correspond to the noise floor amplitudes of the data acquisition channel. Any seismic energy signals having amplitudes smaller than the noise floor of a data acquisition channel would be indistinguishable from noise at the output of the data acquisition channel and would therefore be represented noisily at the output of the channel. The resulting noisy output representation would be inappropriate for use in any seismic data processing that involves such small amplitude seismic energy signals. A data acquisition channel is therefore not capable of transducing input amplitudes that fall below its noise floor.

Words such as "approximately" and "substantially" as used herein mean within +/−10% of the referenced value.

Types of Marine Seismic Surveys

As was mentioned above, marine seismic surveys are performed in bodies of water for a variety of purposes. Usually, their purpose is to determine attributes of structures or materials disposed in earth volumes that lie beneath the bodies of water.

One common type of marine seismic survey is a towed streamer survey. In a towed streamer survey, a vessel tows one or more elongate cables, usually called streamers, in a pattern over a subsurface area of interest. Each of the streamers may include an array of geophysical sensors disposed at intervals along the length of the streamer such that the streamers form a sensor array. One or more seismic sources (typically air guns) are activated as the streamers are towed in the body of water. Acoustic energy generated by the source activations penetrates into underlying earth layers and ultimately is reflected back upward to the sensors. Recording equipment, usually aboard the towing vessel, records signals generated by the sensors in response to the reflected energy. Seismic data processing and imaging techniques are then applied to the recorded signals to produce images of the subsurface structures that produced the reflections.

Another common type of marine seismic survey is a node survey. In a node survey, the geophysical sensors are disposed on or in a set of nodes that are deployed at various locations on the water bottom. In yet another type of marine seismic survey, the ocean bottom cable survey, geophysical sensors may be contained in sensor cables that are disposed on the water bottom. Node surveys and ocean bottom cable surveys may employ the same or similar types of vessels, sources, and sensors, as are employed in towed streamer surveys.

In still other types of marine seismic surveys, a combination of nodes, ocean bottom cables and/or towed streamers may be employed simultaneously.

Figure 2:
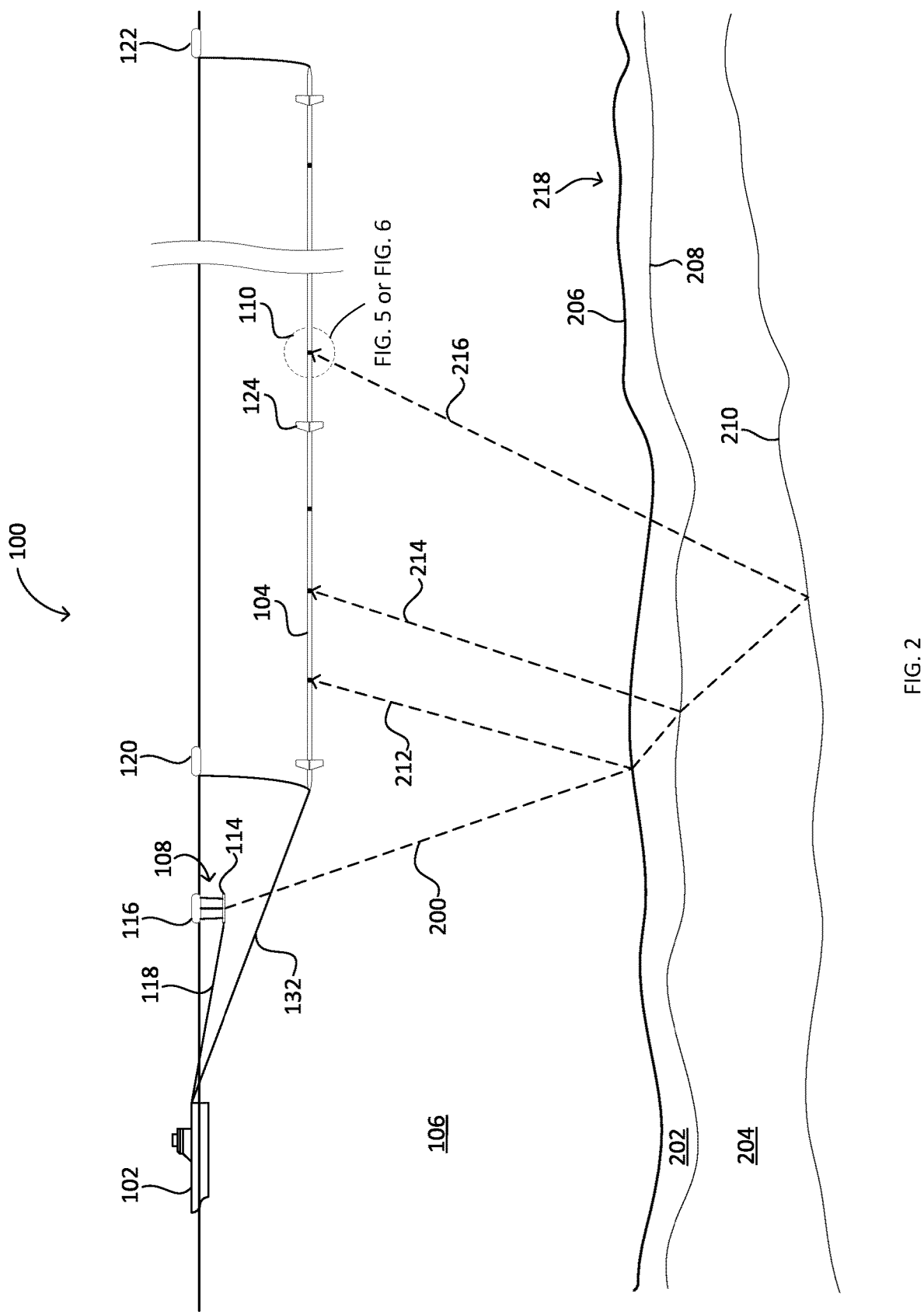
FIG. 2 is a side view of the marine seismic survey system of FIG. 1.

FIGS. 1 and 2 present top and side views, respectively, of an example towed-streamer marine seismic survey system 100. Survey system 100 is representative of a variety of similar geophysical survey systems in which a vessel 102 tows an array of elongate streamers 104 in a body of water 106 such as an ocean, a sea, a bay, or a large lake. Vessel 102 is shown towing twelve streamers in the illustrated example. In other embodiments, any number of streamers may be towed, from as few as one streamer to as many as twenty or more. Embodiments to be described below have useful application in relation to towed-streamer surveys such as that depicted in FIGS. 1 and 2. They may also have useful application in other environments in which other types of sensors or sensor cables are used—for example, in environments that use ocean-bottom sensor cables or ocean-bottom nodes. The terms "streamer" and "cable" may be used interchangeably below.

During a typical marine seismic survey, one or more seismic sources 108 are activated to produce acoustic energy 200 that propagates in body of water 106. Energy 200 penetrates various layers of sediment and rock 202, 204 underlying body of water 106. As it does so, it encounters interfaces 206, 208, 210 between materials having different physical characteristics, including different acoustic impedances. At each such interface, a portion of energy 200 is reflected upward while another portion of the energy is refracted downward and continues toward the next lower interface, as shown. Reflected energy 212, 214, 216 is detected by sensors or sensor groups 110 disposed at intervals along the lengths of streamers 104. In FIGS. 1 and 2, sensors 110 are indicated as black squares inside each of streamers 104. The sensors produce signals corresponding to the reflected energy. These signals are collected and recorded by control equipment 112 located onboard vessel 102. The recorded signals may be processed and analyzed onboard vessel 102 and/or at one or more onshore data centers to produce images of structures within subsurface 218. These images can be useful, for example, in identifying possible locations of hydrocarbon reservoirs within subsurface 218.

In the illustrated example, vessel 102 is shown towing a total of two sources 108. In other systems, different numbers of sources may be used, and the sources may be towed by other vessels, which vessels may or may not tow streamer arrays. Typically, a source 108 includes one or more source subarrays 114, and each subarray 114 includes one or more acoustic emitters such as air guns or marine vibrators. A distinction between a "source" as used herein and a source subarray is that the crossline distance between two or more "sources" towed during a survey is generally greater than the crossline distance between subarray elements within any one of the two or more sources. Another distinction is that separate "sources" as used herein are capable of independent activation, whereas the subarray elements within a single source are typically not capable of independent activation, but rather may only be activated in tandem, responsive to a single source activation signal.

Each subarray 114 may be suspended at a desired depth from a subarray float 116. Compressed air as well as electrical power and control signals may be communicated to each subarray via source umbilical cables 118. Data may be collected, also via source umbilical cables 118, from various sensors located on subarrays 114 and floats 116, such as acoustic transceivers and global positioning system ("GPS") units. Acoustic transceivers and GPS units so disposed help to accurately determine the positions of each subarray 114 during a survey. In some cases, subarrays 114 may be equipped with steering devices to better control their positions during the survey.

Streamers 104 are often very long, on the order of 5 to 10 kilometers, so usually are constructed by coupling numerous shorter streamer sections together. Each streamer 104 may be attached to a dilt float 120 at its proximal end (the end nearest vessel 102) and to a tail buoy 122 at its distal end (the end farthest from vessel 102). Dilt floats 120 and tail buoys 122 may be equipped with GPS units as well, to help determine the positions of each streamer 104 relative to an absolute frame of reference such as the earth. Each streamer 104 may in turn be equipped with acoustic transceivers and/or compass units to help determine their positions relative to one another. In many survey systems 100, streamers 104 include steering devices 124 attached at intervals, such as every 300 meters. Steering devices 124 typically provide one or more control surfaces to enable moving the streamer to a desired depth, or to a desired lateral position, or both. Paravanes 126 are shown coupled to vessel 102 via tow ropes 128. As the vessel tows the equipment, paravanes 126 provide opposing lateral forces that straighten a spreader rope 130, to which each of streamers 104 is attached at its proximal end. Spreader rope 130 helps to establish a desired crossline spacing between the proximal ends of the streamers. Power, control, and data communication pathways are housed within lead-in cables 132, which couple the sensors and control devices in each of streamers 104 to the control equipment 112 onboard vessel 102.

Collectively, the array of streamers 104 forms a sensor surface at which acoustic energy is received for recording by control equipment 112. In many instances, it is desirable for the streamers to be maintained in a straight and parallel configuration to provide a sensor surface that is generally flat, horizontal, and uniform. In other instances, an inclined and/or fan shaped receiving surface may be desired and may be implemented using control devices on the streamers such as those just described. Other array geometries may be implemented as well. Prevailing conditions in body of water 106 may cause the depths and lateral positions of streamers 104 to vary at times, of course. In various embodiments, streamers 104 need not all have the same length and need not all be towed at the same depth or with the same depth profile.

Figure 3:
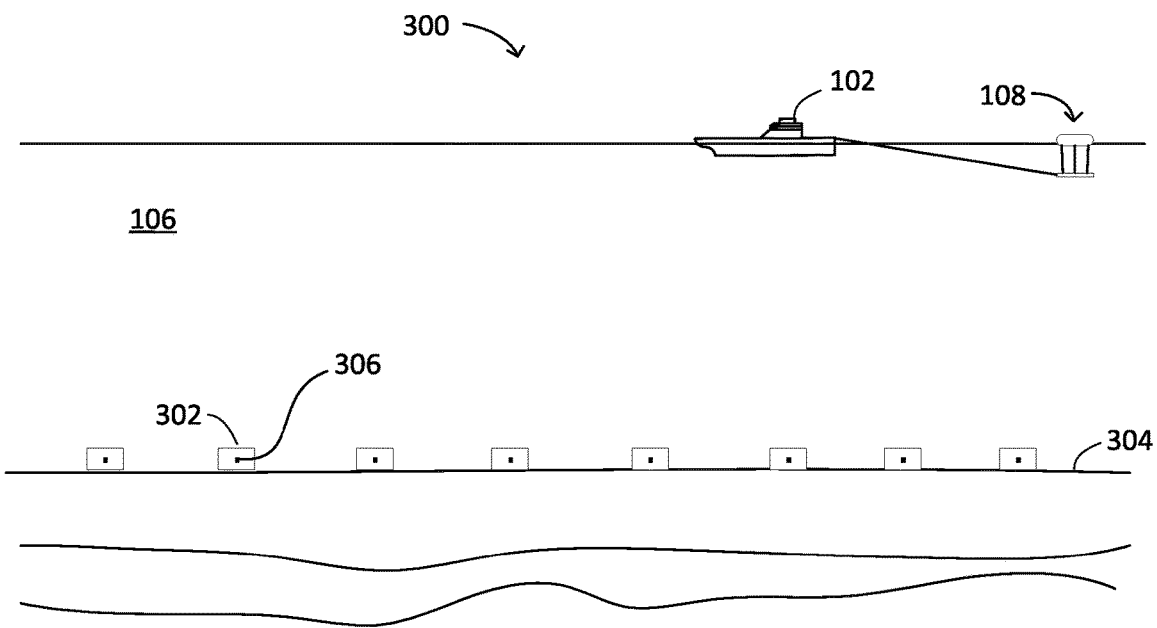
FIG. 3 is a side view of an example ocean bottom node survey system in accordance with embodiments.

FIG. 3 illustrates an example ocean bottom node survey system 300, in which a vessel 102 tows one or more sources 108 over an installation of one or more ocean bottom nodes 302, each of which is disposed on a water bottom 304. Each node 302 may include one or more sensors or sensor groups 306 as shown. Signals generated by the sensors or sensor groups may be collected in the nodes for later retrieval, or may be transmitted to a collection point, or both.

Figure 4:
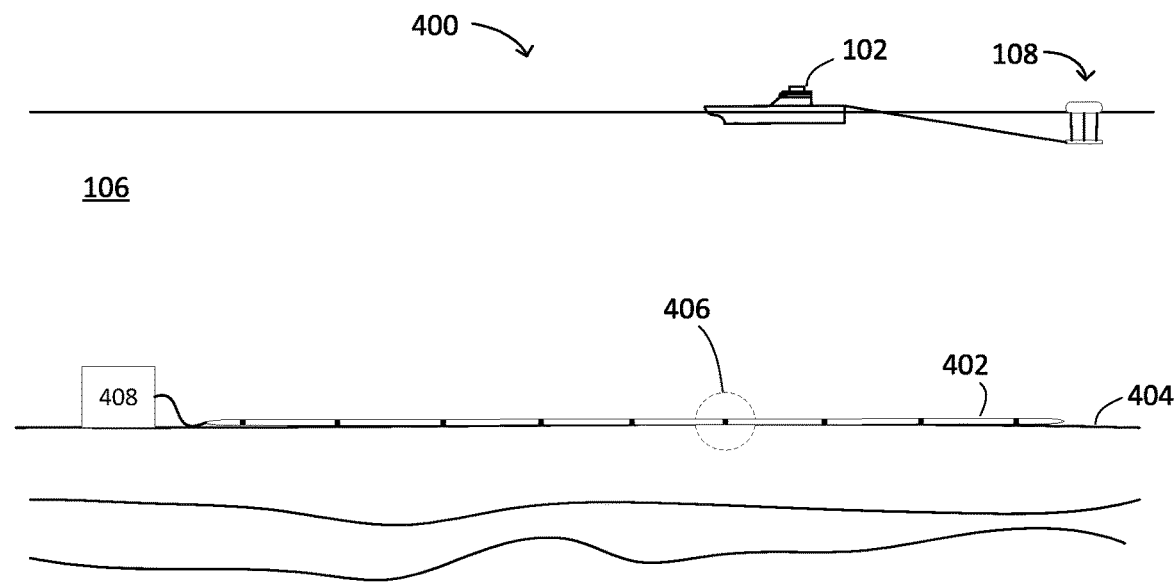
FIG. 4 is a side view of an example ocean bottom cable survey system in accordance with embodiments.

FIG. 4 illustrates an example ocean bottom cable survey system 400, in which a vessel 102 tows one or more sources 108 over an installation of one or more ocean bottom cables 402, each of which is disposed on a water bottom 404. Each cable 402 may include one or more sensors or sensor groups 406 disposed along its length, generally as shown. In turn, each of the cables may be coupled to a manifold 408 in which signals from the sensors may be aggregated and either stored or transmitted to a collection point, or both.

Techniques to be described herein may be employed in the context of any of the above or similar types of marine seismic surveys.

Sensors and Sensor Groups

Sensors 110 within each a streamer or node or cable may include one or more different sensor types, such as pressure sensors (e.g. hydrophones), velocity sensors (e.g. geophones), and acceleration sensors such as micro-electromechanical system ("MEMS") devices.

Figure 5:
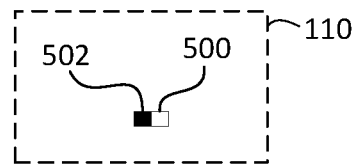
FIGS. 5-7 are block diagrams schematically illustrating example arrangements for disposing seismic sensors in a streamer, or in an ocean bottom node, or in an ocean bottom cable, in accordance with embodiments.
Figure 6:
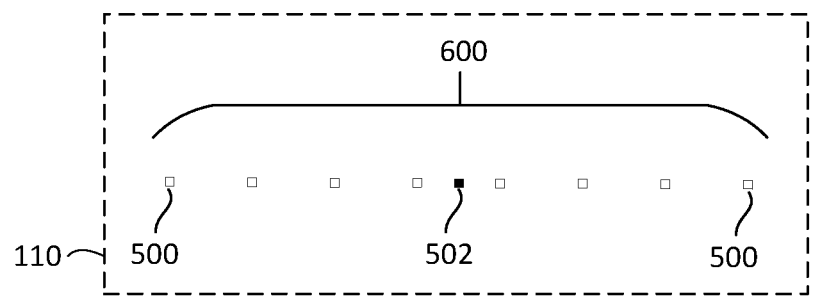
Figure 7:
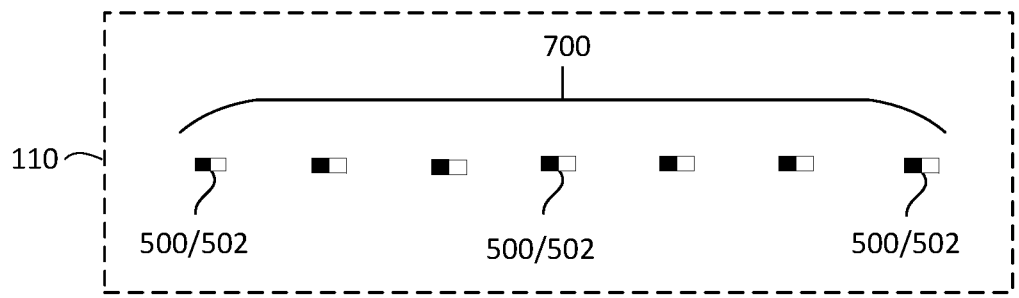

FIGS. 5, 6, and 7 illustrate several example arrangements consistent with embodiments for disposing sensors 110 in a streamer 104, or in an ocean bottom node 302, or in an ocean bottom cable 402. In each illustration, pressure sensors are indicated with white squares, while motion sensors are indicated with shaded squares. The sensor types illustrated are provided only for the purpose of explanation; other sensor types may also be used, either in addition to or in lieu of the sensor types illustrated.

In the arrangement of FIG. 5, each sensor location 110 comprises a single pressure sensor 500 collocated with a single motion sensor 502. In the arrangement of FIG. 6, each sensor location 110 comprises a set of pressure sensors 500 forming a single pressure sensor group 600. A motion sensor 502 is disposed substantially at the center of pressure sensor group 600. It is also possible to employ a similar arrangement in which a single pressure sensor is disposed among a group of motion sensors. Typically, the signals generated by sensors forming a sensor group are combined or aggregated in some way, such as by summation and/or averaging. Such combination or aggregation may be accomplished in any suitable manner, such as in an analog domain using appropriate electrical coupling, or in a digital domain using digital data processing. In general, a sensor group may include any number of sensors and may comprise either pressure sensors or motion sensors. Normally, however, only measurements of the same type in a group (e.g., pressure, velocity, or acceleration) would be subject to combination or aggregation. Thus, in the particular arrangement illustrated in FIG. 6, the measurements of pressure sensors 500 may be combined or aggregated into a single signal, while the measurements of motion sensor 502 would be preserved as a separate signal. In the arrangement of FIG. 7, each sensor location 110 comprises a group 700 of collocated pressure sensors 500 and motion sensors 502. In the latter arrangement, one aggregated signal can be generated from the pressure sensors in the group, while another aggregated signal can be generated from the motion sensors in the group. Various other permutations of the arrangements of FIGS. 5, 6, and 7 are also possible. For example, any of these arrangements may comprise pressure sensors only or motion sensors only.

Techniques to be described herein may be employed in conjunction with any of the above or similar types of seismic sensors or sensor groups. The term "sensor" as used herein is meant to include both an individual sensor or a sensor group.

Offsets in Marine Seismic Surveys

Figure 8:
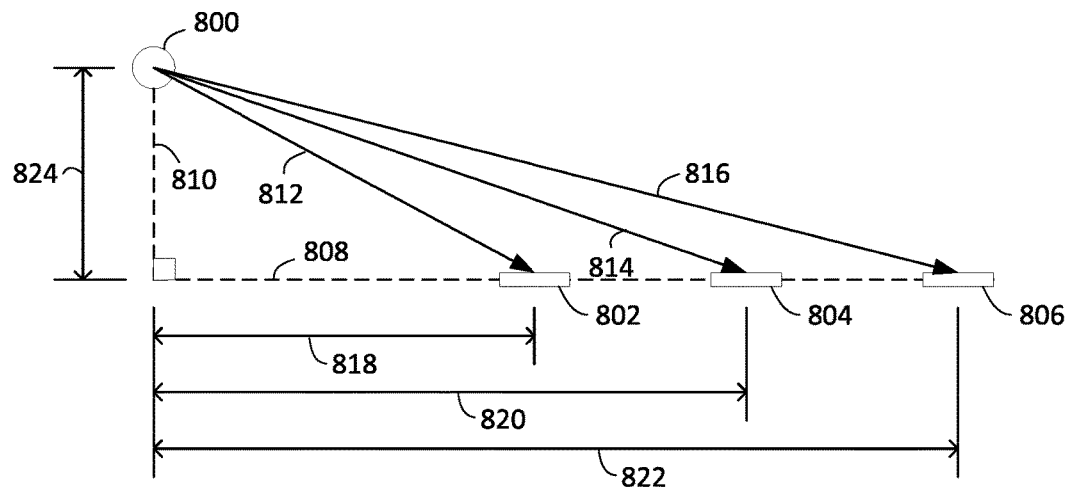
FIG. 8 is a block diagram schematically illustrating example offsets in marine seismic surveys.

The concept of an offset in marine seismic surveying refers generally to a distance between a source and a receiver. Such a distance may be measured in a variety of ways. FIG. 8 is provided to illustrate several such ways in more detail. In the figure, circle 800 represents a marine seismic source, while each of rectangles 802, 804, 806 represents a sensor or a sensor group. Sensors or sensor groups 802-806 may represent, for example, sensors disposed along the length of a single streamer 104, or sensors disposed in distinct ocean bottom nodes 302, or sensors disposed in an ocean bottom cable 402. Dashed line 808 depicts an inline direction. Dashed line 810 depicts a crossline direction orthogonal to the inline direction. Typically, a vessel towing a source would follow a sail path parallel to the inline direction 808. The distance between a source and any one sensor or sensor group constitutes an offset. Such an offset may be measured from the source to a single sensor, or to any one of the sensors within a sensor group, or to the center of a sensor group.

Three different example offsets are illustrated in the drawing, ranging in length from a smallest offset 812, to an intermediate length offset 814, to a largest offset 816. A distance along the straight line path between a source and a given sensor or sensor group, as depicted by arrows 812-816, is commonly referred to as a "seismic offset" or simply an "offset." A distance along direction 808 between a source and the inline projection of a sensor or sensor group is commonly referred to as an "inline offset." Thus, sensor or sensor group 802 defines a smallest inline offset 818 with respect to source 800, sensor or sensor group 804 defines an intermediate length inline offset 820 with respect to the source, and sensor or sensor group 806 defines a largest inline offset 822 with respect to the source. Similarly, a distance along direction 810 between a sensor or sensor group and the crossline projection of the source is commonly referred to as a "crossline offset." In the illustrated example, each of sensors or sensor groups 802-806 defines the same crossline offset 824 with respect to source 800.

The term "offset" as used herein may refer to any of the above-described distances, in accordance with the context, although the phrases "negative offset," "zero offset," and "short offset" typically refer to an inline offset distance rather than an absolute distance between the source and the receiver.

Problems Associated with Recording Seismic Data at Short Offsets

Figure 9:
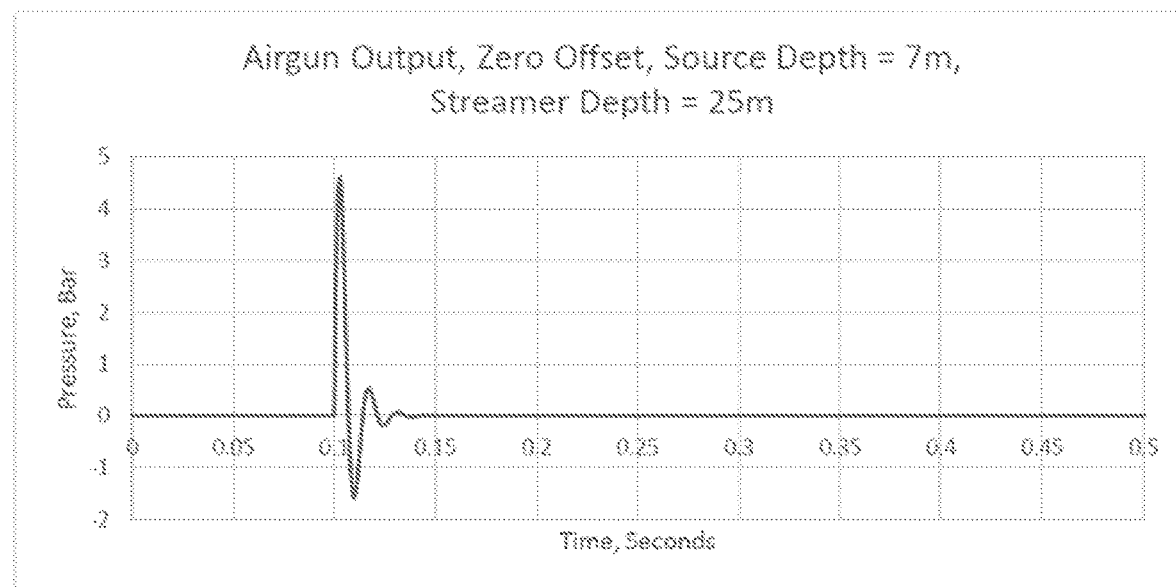
FIG. 9 is a graph illustrating example seismic energy amplitude levels associated with a marine seismic source activation in a body of water.
Figure 10:
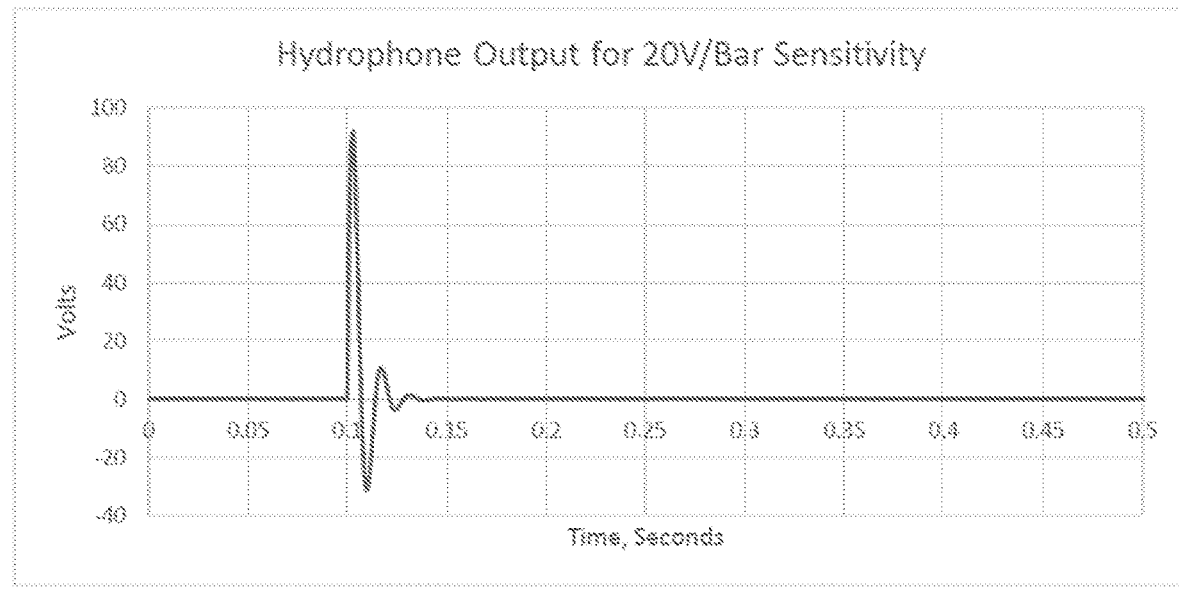
FIG. 10 is a graph illustrating an example 20V/Bar hydrophone output associated with the marine seismic source activation of FIG. 9.
Figure 11:
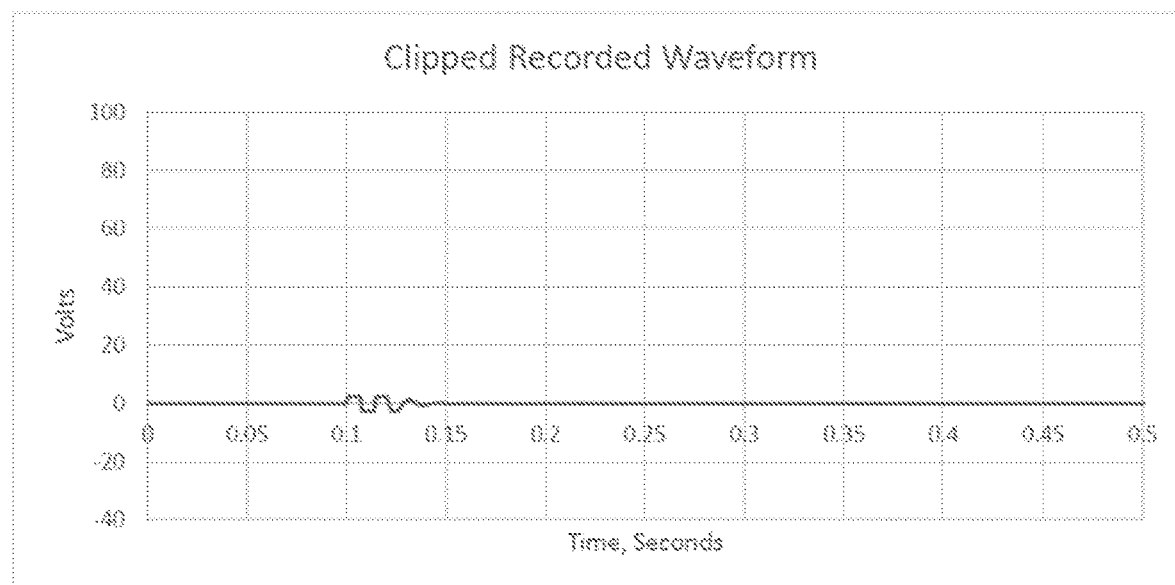
FIG. 11 is a graph illustrating output from a conventional seismic data acquisition channel associated with the hydrophone of FIG. 10.

One problem that has been encountered during attempts to record short, zero, or negative offset seismic reflections has been the close proximity that is required between the source and the receivers used to record the short offset seismic data. Specifically, as the direct wave from the seismic source passes the receivers in a body of water on its way into the subsurface, the short offset receivers are exposed to seismic energy having significantly higher amplitude than are receivers that are disposed at longer offsets. (The phrase "seismic energy," as used herein, refers to acoustic energy that falls within a frequency band of interest in marine seismic surveying. Typically, such a frequency band extends from approximately 0 Hz to approximately 200 Hz, although the frequencies of interest may vary depending on the parameters of a given survey.) Moreover, traditional seismic receivers are quite sensitive, having been optimized to capture reflection seismic energy that may exhibit very small amplitudes. Consequently, when a traditional seismic receiver is disposed in a location suitable to record short, zero, or negative offset seismic reflections, the direct wave from the source activation usually saturates the data acquisition channel at the receiver location. FIGS. 9, 10, and 11 illustrate this in more detail.

FIG. 9 illustrates, by way of example, acoustic signal intensities associated with a marine air gun source array having a total source volume of 4130 cubic inches, operated at 2000 psi. With such a source array disposed at 7 m water depth, the estimated peak sound pressure level that occurs directly under the source array at a depth of 25 m (i.e., at a sensor located 18 m from the source) will be approximately 4.6 Bar. FIG. 9 shows a representative direct wave produced by such an air gun array and measure at such a short distance. As can be seen from the graph, the pressure waveform exhibits a peak pressure of approximately 4.6 Bar.

Over many years, the sensitivity of seismic streamer hydrophones has broadly been accepted in the industry as being 20V/Bar. Thus, the term "conventional seismic sensor" when used herein with reference to a hydrophone refers to a hydrophone having a sensitivity of approximately 20V/Bar. Assume that such a conventional hydrophone sensor having a sensitivity of 20V/Bar is disposed at the 25 m depth, and is thus disposed 18 m from the air gun source. FIG. 10 indicates that, for a conventional hydrophone so located, the peak hydrophone output voltage induced by the direct wave from the air gun source array of FIG. 8 would be 92V.

The 92V signal, however, would exceed the saturation limits of a conventional marine seismic data acquisition channel. A conventional marine seismic data acquisition channel is implemented using a 24-bit analog to digital converter ("ADC") having unity gain having upper and lower saturation limits that correspond to input voltages of +2.5V and −2.5V, respectively. Thus, when the 92V signal is applied to the input of a conventional marine seismic data acquisition channel, the output representation is "clipped" at +2.5V and −2.5V.

Accordingly, FIG. 11 illustrates the output of such a conventional marine seismic data acquisition channel when the conventional hydrophone signal of FIG. 10 is applied to the input of the channel. As the drawing illustrates, the waveform of FIG. 10 as transduced by the conventional data acquisition channel is clipped, such that the maximum voltage appearing on the output of the channel is +/−2.5V, even during times when the voltage level applied to the input of the data acquisition channel exceeds +/−2.5V. Thus, in the case of a conventional marine seismic data acquisition channel that is associated with a conventional hydrophone, the largest amplitude seismic energy signal that can be transduced by the data acquisition channel is +/−2.5V peak÷20V/Bar=+/−0.125 Bar peak.

FIG. 11 shows clearly that, when a conventional hydrophone sensor or sensor group is disposed close to a typical air gun source, the sensor output voltages caused by the direct downward acoustic signal from the source are significantly greater than the upper limit that can be transduced by a conventional seismic data acquisition channel associated with the hydrophone group. This is problematic for at least two reasons. First, it is desirable in some seismic imaging applications to have an accurate recording of the direct wave itself. For data acquisition channels that are saturated by the direct wave signal, however, such a recording is not possible. Instead, when saturation occurs, all useful information about the direct downward acoustic signal is lost. Second, saturation of the data acquisition channel causes some of the desired reflection energy to be lost as well, due to the time required for the acquisition channel to recover from saturation.

A need therefore exists for techniques that may be used to acquire extended dynamic range seismic signal recordings, especially in the context of marine seismic surveys that require the collection of data at short, zero, or negative offsets.

Figure 12:
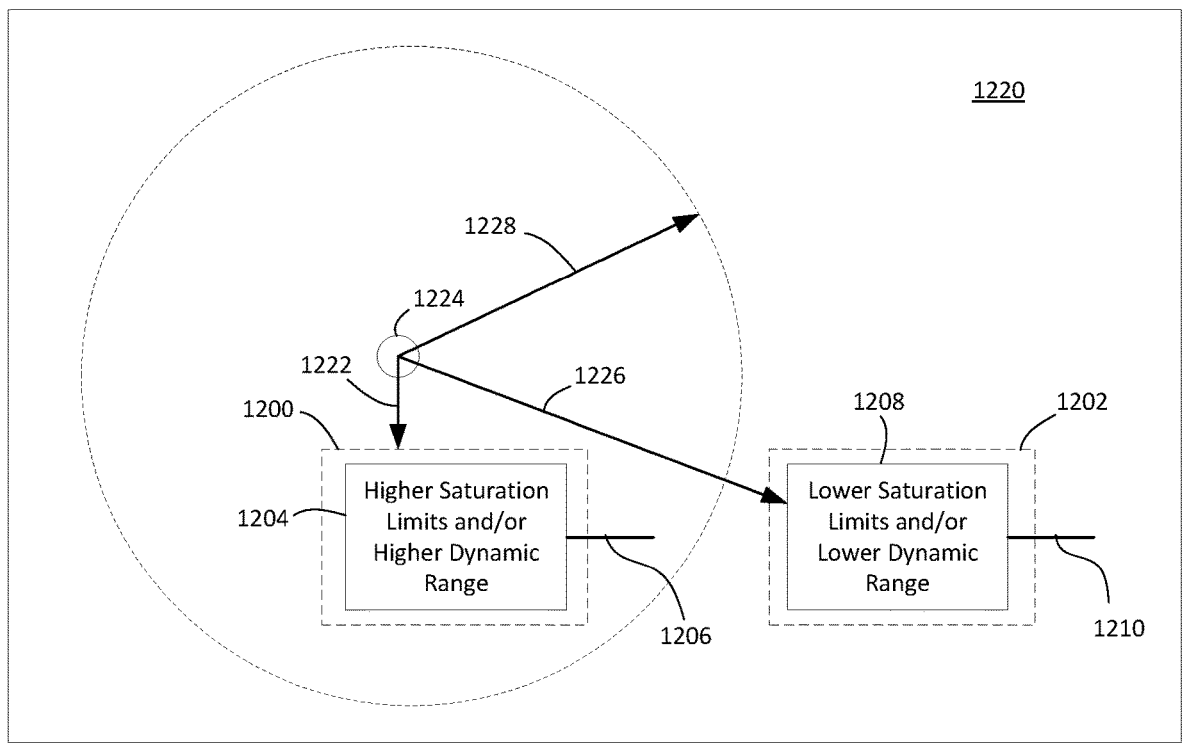
FIG. 12 is a block diagram schematically illustrating a marine seismic data acquisition system that includes seismic data acquisition channels having different saturation limits and/or different dynamic ranges, and deployed in different locations, in accordance with embodiments.

Seismic Data Acquisition Channels Having a Same Sensor Type but Having Different Saturation Limits and/or Different Dynamic Ranges FIG. 12 schematically illustrates a class of example embodiments that may be used to address the above-described problems beneficially. In such embodiments, one or more first containers 1200 and one or more second containers 1202 are provided. Each container is configured to be deployable in a body of water 1220. Container 1200 includes a first seismic data acquisition channel 1204 having an output 1206 that is capable of transducing seismic energy in the body of water having a first maximum amplitude. Container 1202 includes a second seismic data acquisition channel 1208 having an output 1210 that is capable of transducing seismic energy in the body of water having a second maximum amplitude. Data acquisition channel 1204 is associated with at least a first seismic sensor or sensor group, and data acquisition channel 1208 is associated with at least a second seismic sensor or sensor group.

The sensors that are associated with each of data acquisition channels 1204, 1208 correspond to a same sensor type, although the sensors need not have identical properties. For example, in embodiments in which the sensor(s) associated with channel 1204 are hydrophone sensors, the sensor(s) associated with channel 1208 are also hydrophone sensors, although at least some of the hydrophone(s) associated with channel 1204 may have different properties than the hydrophone(s) associated with channel 1208. Similarly, in embodiments in which the sensor(s) associated with channel 1204 are geophone sensors, the sensor(s) associated with channel 1208 are also geophone sensor(s), although the two groups of geophone sensors may have different properties. In some embodiments, the sensors associated with channels 1204, 1208 may comprise piezoelectric sensors, such as piezoelectric hydrophones or piezoelectric accelerometers.

In example embodiments, the first maximum amplitude is higher than the second maximum amplitude. That is, data acquisition channel 1204 is capable of transducing seismic energy having a higher maximum amplitude than data acquisition channel 1208 is capable of transducing. This may be accomplished, for example, by causing data acquisition channel 1204 to exhibit higher saturation limits than data acquisition channel 1208. In further embodiments, data acquisition channel 1204 may feature a higher dynamic range than data acquisition channel 1208. This may be accomplished, for example, by causing data acquisition channel 1204 not only to exhibit higher saturation limits than data acquisition channel 1208, but also to exhibit the same noise floor as does channel 1208.

In various embodiments, each of outputs 1206, 1210 may correspond to the output of a respective ADC module.

Container 1200 is shown disposed in a body of water 1220 at a first distance 1222 from a marine seismic source 1224. Container 1202 is shown disposed in the body of water at a second distance 1226 from the marine seismic source. Distance 1222 is such that the intensity of direct wave seismic energy received by the sensor(s) associated with channel 1204 responsive to an activation of source 1224 does not exceed the first maximum amplitude (e.g., does not exceed the saturation limits of channel 1204), but does exceed the second maximum amplitude (e.g., does exceed the saturation limits of channel 1208). Distance 1226 is larger, however, than distance 1222, such that the intensity of direct wave seismic energy received at the sensor(s) associated with channel 1208 does not exceed the second maximum amplitude (e.g., does not exceed the saturation limits of channel 1208).

Data acquisition channels 1208 may be implemented using a conventional marine seismic data acquisition channel, while data acquisition channels 1204 may be implemented in accordance with any of several techniques to be described below. While data acquisition channels 1204 may be more expensive to manufacture than channels 1208, a fewer number of channels 1204 than channels 1208 may be deployed in a survey. For example, data acquisition channels 1204 need only be deployed at positions within range 1228 from source 1224, where data acquisition channels 1208 would be saturated by the direct seismic energy wave that emanates from an activation of the source. Data acquisition channels 1208, on the other hand, may be deployed at many more positions falling outside of this range. In this manner, the direct wave that emanates from the source may be transduced by both types of data acquisition channels, as desired, while the expense of the deployment may be reduced by using conventional data acquisition channels where it is possible to do so (e.g., where the direct wave amplitudes will not exceed that saturation limits of conventional data acquisition channels).

If desired, some data acquisition channels 1208 may also be deployed within range 1228 along with channels 1204, and some data acquisition channels 1204 may be deployed outside of range 1228 along with channels 1208.

In some embodiments, one or more data acquisition channels 1204 may be deployed in a direction vertically underneath source 1224, as illustrated in FIG. 12. In other embodiments, data acquisition channels 1204 may be deployed elsewhere, at positions that are not vertically underneath the source but that are nevertheless within range 1228.

Figure 13:
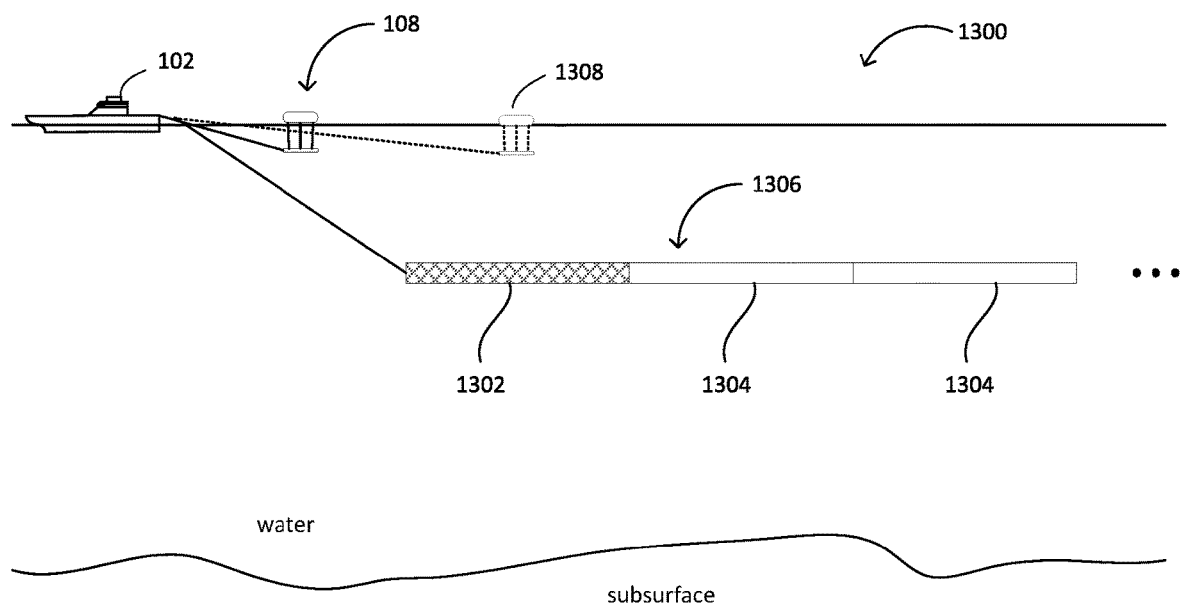
FIGS. 13 and 14 are side views illustrating example marine seismic data acquisition systems in which the data acquisition channels of FIG. 12 are disposed in one or more seismic streamers in accordance with embodiments.
Figure 14:
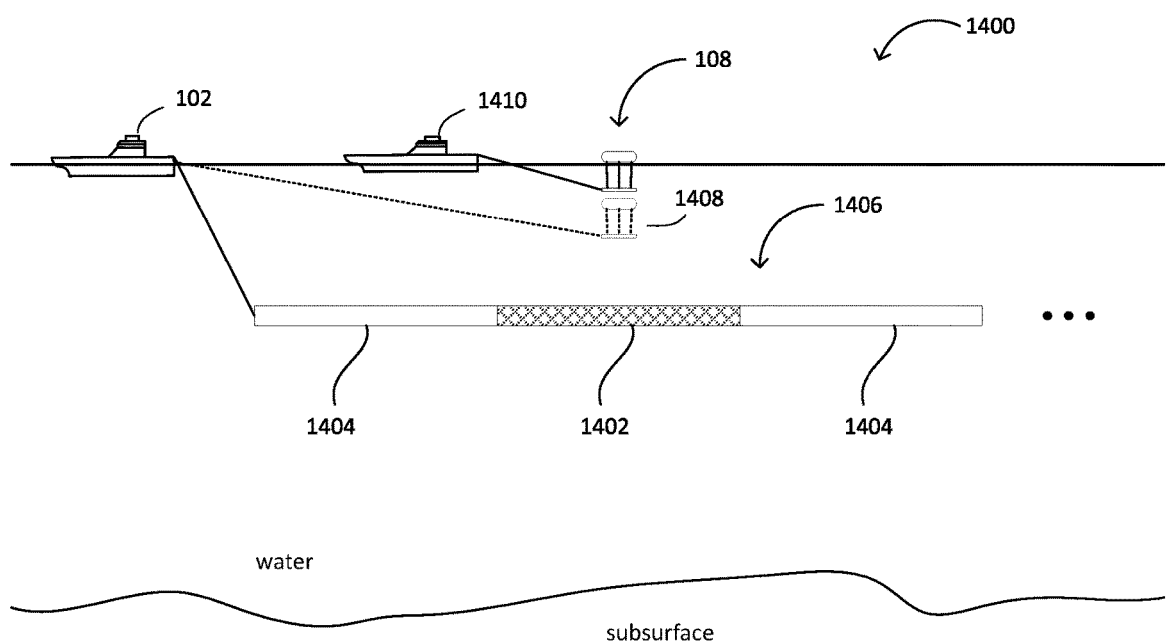

Containers 1200 and 1202 may be configured for underwater deployment in a variety of ways. FIGS. 13 and 14 illustrate two example embodiments, 1300 and 1400, in which each of containers 1200 and 1202 comprises a special marine seismic streamer, or a special section of a marine seismic streamer. In both embodiments, data acquisition channels 1204 may be contained within one or more special streamer sections 1302, 1402 while data acquisition channels 1208 may be contained within one or more conventional streamer sections 1304, 1404. Each such streamer section may be configured to be coupled to one or more other streamer sections to form a longer streamer, as was generally explained above with reference to FIGS. 1 and 2. Thus, in some embodiments, a special streamer section 1302, 1402 may be configured to be coupled to a conventional streamer section 1304, 1404, or to another special streamer section. In other embodiments, the special streamer sections 1302, 1402 may be towed separately from the conventional streamer sections and need not be configured to couple to any other streamer sections.

A variety of similar configurations are possible. In the embodiment of FIG. 13, for example, the special streamer section 1302 is shown disposed at the front end of streamer 1306 (the end nearest to tow vessel 102) but not directly underneath source 108. In this configuration, data acquisition channels 1204 in streamer section 1302 are disposed for recording "short offset" seismic data. In different configurations, source 108 may be towed directly over section 1302, as indicated at 1308, such that data acquisition channels 1204 in streamer section 1302 are disposed to record "zero offset" seismic data. In still further configurations, as illustrated in FIG. 14, the special streamer section may be disposed in a position other than at the front end of a streamer 1406, such that one or more conventional streamer sections 1404 are ahead of special section 1402. In the latter arrangements, data acquisition channels 1204 contained within special streamer section 1402 may be disposed to record "zero offset" seismic data in a direction vertically underneath a seismic source 108, while data acquisition channels 1208 contained within the streamer sections that are towed ahead of the special section may record "negative offset" seismic data. In such arrangements, the source may be towed either by the same vessel 102 that tows streamer 1406, as indicated schematically at 1408, or may be towed by a separate vessel 1410, also as shown.

In surveys that employ ocean bottom nodes, data acquisition channels 1204 may be contained within one or more ocean bottom nodes that are deployed within range 1228 from a marine seismic source used in the survey, while other ocean bottom nodes containing data acquisition channels 1208 may be deployed outside of range 1228.

Similarly, in surveys that employ an ocean bottom cable system, data acquisition channels 1204 may be contained within one or more cables, or portions of cables, that are deployed within range 1228 from a marine seismic source used in the survey, while other cables or portions of cables containing data acquisition channels 1208 may be deployed outside of range 1228.

Data acquisition channels 1204 suitable for use in embodiments may be constructed according to a variety of techniques, several examples of which will now be described.

Figure 15:
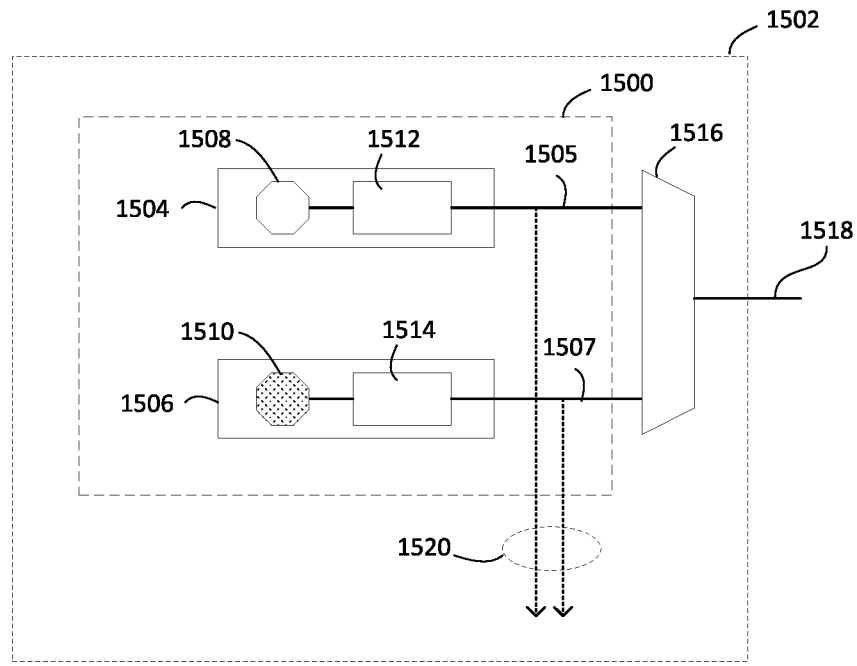
FIG. 15 is a block diagram schematically illustrating a first example class of extended dynamic range data acquisition channels in accordance with embodiments.

Separate Same-Gain Subchannels Associated with Sensors Having Different Sensitivities FIG. 15 illustrates a first example technique for implementing a data acquisition channel 1204 having extended saturation limits and/or an extended dynamic range. The class of embodiments illustrated in FIG. 15 is based on using separate seismic sensors having different sensitivities. More particularly, a data acquisition channel according to this class of embodiments features two or more data acquisition subchannels, each of which is associated with a separate seismic sensor. While the gain that is associated with the electronics in each of the subchannels may be the same for each subchannel, the sensitivities of the seismic sensors or sensor groups that are associated with the subchannels are unique across the subchannels. Seismic data are gathered by each of the subchannels simultaneously, and a hybrid waveform may be constructed from the subchannel outputs—either in real time during the data acquisition itself, or later, during data processing steps that occur after the data have been acquired or after the survey has been completed.

Referring now to FIG. 15, two types of embodiments are shown, labeled 1500 and 1502, respectively. Either type of embodiment, 1500 or 1502, may be used to implement a data acquisition channel 1204 as described above. Both types of embodiments are formed using two data acquisition subchannels 1504, 1506. In further embodiments, more subchannels may be used. Each data acquisition subchannel 1504, 1506 is associated with at least one seismic sensor or sensor group. In the illustrated embodiments, subchannel 1504 is associated with seismic sensor 1508, and subchannel 1506 is associated with seismic sensor 1510. The difference between embodiments 1500 and embodiments 1502 is the presence or absence of a data selection unit 1516, which will be described further below.

In both types of embodiments illustrated in FIG. 15, sensor 1510 has lower sensitivity than does sensor 1508. In some embodiments, sensor 1508 may correspond to a conventional seismic sensor (having conventional sensitivity), while sensor 1510 may correspond to a reduced-sensitivity seismic sensor. A reduced-sensitivity seismic sensor may exhibit reduced sensitivity by virtue of the way in which the sensor is constructed, or may correspond to a conventional seismic sensor having suitable attenuation circuitry added thereto such that the otherwise-conventional output of the sensor is attenuated relative the sensitivity that it exhibits when not coupled to the attenuation circuitry. The term "reduced sensitivity seismic sensor" and its variants as used herein refer to a marine seismic sensor whose sensitivity is lower than that of a conventional marine seismic sensor of the same type. Techniques for creating a reduced sensitivity seismic sensor from a conventional seismic sensor will be discussed in further detail below.

In one example embodiment, sensor 1508 may comprise a conventional hydrophone or hydrophone group having a sensitivity of approximately 20V/Bar, while sensor 1510 may comprise a hydrophone or hydrophone group having a sensitivity of approximately 0.5V/Bar.

In the classes of embodiments illustrated in FIG. 15, both of subchannels 1504 and 1506 may include a respective ADC module 1512, 1514. In such cases, the output of each data acquisition subchannel may correspond to the output of the corresponding ADC module. In such embodiments, ADC modules 1512, 1514 may have identical characteristics. For example, each of ADC modules 1512 and 1514 may provide the same gain. For implementations in which the respective ADC modules contain a programmable gain internal amplifier, the gain of the internal amplifiers may be fixed in each ADC module such that it does not change during a given seismic survey.

Despite the fact that subchannels 1504 and 1506 have the same gain, because the sensors associated with the two subchannels have different sensitivities, the maximum seismic energy amplitudes that can be transduced by the outputs 1505, 1507 of the two subchannels will be different from one another. More particularly, the maximum seismic energy amplitude that can be transduced by output 1507 will be higher than the maximum seismic energy amplitude that can be transduced by output 1505, because seismic sensor 1508 has higher sensitivity than does seismic sensor 1510.

In such embodiments, the noise floor of subchannel 1506, and thus the minimum amplitude seismic energy that subchannel 1506 can transduce, may be chosen to be below the maximum amplitude seismic energy that subchannel 1504 can transduce. In this way, the range of seismic energy amplitudes that can be transduced by a data acquisition channel constructed in accordance with embodiments 1500 or 1502 will correspond to the range between the maximum seismic energy amplitude that subchannel 1506 can transduce and the minimum seismic energy amplitude that subchannel 1504 can transduce.

As was mentioned above, embodiment 1502 includes a subchannel selection unit 1516. In the latter embodiments, the output 1518 of the data acquisition channel may correspond to the output of the subchannel selection unit. The subchannel selection unit functions to create a hybrid waveform by producing a stream of output samples at output 1518, such that each output sample is selected from one or the other of subchannels 1504 and 1506. Specifically, at a time increment when the incoming seismic energy amplitude does not exceed the maximum amplitude that subchannel 1504 can transduce, the output sample for the corresponding time increment is selected from subchannel 1504. But at a time increment when the incoming seismic energy amplitude does exceed the maximum amplitude that subchannel 1504 can transduce, the output sample for the corresponding time increment is selected from subchannel 1506. For output samples selected from subchannel 1504, a suitable scaling factor is applied to the sample so as to account for the difference in sensitivities of the two subchannels. In this way, a hybrid output waveform is presented at output 1518. The hybrid output waveform so presented exhibits both the extended dynamic range that is associated with subchannel 1506 for large signal seismic inputs, and the superior signal to noise ratio that is associated with subchannel 1504 for small signal seismic inputs.

In the embodiments of FIG. 15, the minimum amplitude seismic energy that can be transduced corresponds noise floor of subchannel 1504, while the maximum amplitude seismic energy that can be transduced corresponds to that of subchannel 1506.

Embodiments 1500 need not include a subchannel selection unit. Rather, embodiments 1500 may provide separate outputs for each subchannel, as shown at 1520. Recording equipment, such as recording equipment on a marine survey vessel or in an ocean bottom device, may be configured to record the separate outputs. The separately recorded outputs may then be combined by data processing equipment at any suitable location and at any suitable time to create a hybrid waveform such as any of those described herein.

Generation of a Hybrid Waveform from Subchannel Outputs

Figure 17:
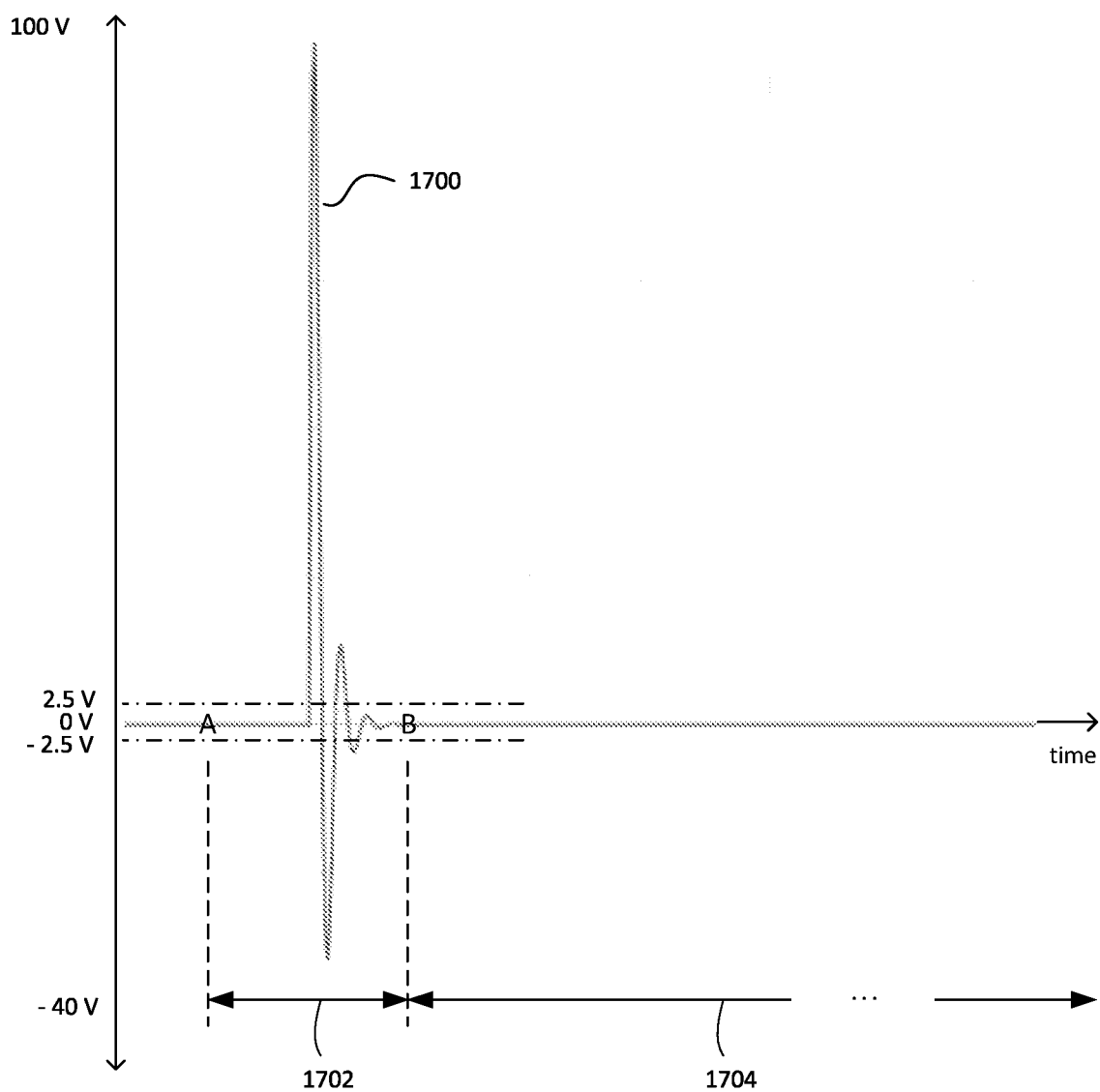
FIG. 17 is a graph illustrating a hybrid waveform in according with embodiments.

By way of example, FIG. 17 illustrates a hybrid waveform in more detail. Hybrid waveform 1700 represents a signal that might be generated by data acquisition channel 1502 in response to a direct wave of seismic energy received at a short distance from an actuation of a marine seismic source such as an air gun array. In the drawing, time A represents the time at which the source is activated, and time B indicates the time by which the direct acoustic wave from the source activation would be expected to have completely passed through the location of sensor 1508, based on the relative locations of the source and the sensor, and the known propagation velocity of sound in water. A first time window 1702 may be defined as the period of time beginning at source activation time A and ending at time B, when the direct wave is expected to have passed the sensor. A second time window 1704 may be defined as the period of time beginning at time B and continuing until the next source activation time. Given the time scale of the drawing, acoustic energy from subsurface reflectors in response to the source activation would be expected to arrive at sensor 1508 much later than time B, and so the reflection energy associated with the source activation is not shown in the drawing. In the case of waveform 1700, such reflection seismic energy would be expected to have maximum signal intensity values in the range between +/−2.5 V, whereas the direct wave seismic energy from the source activation would be expected to have much higher signal intensity—on the order of +/−100 V, as shown.

Figure 18:
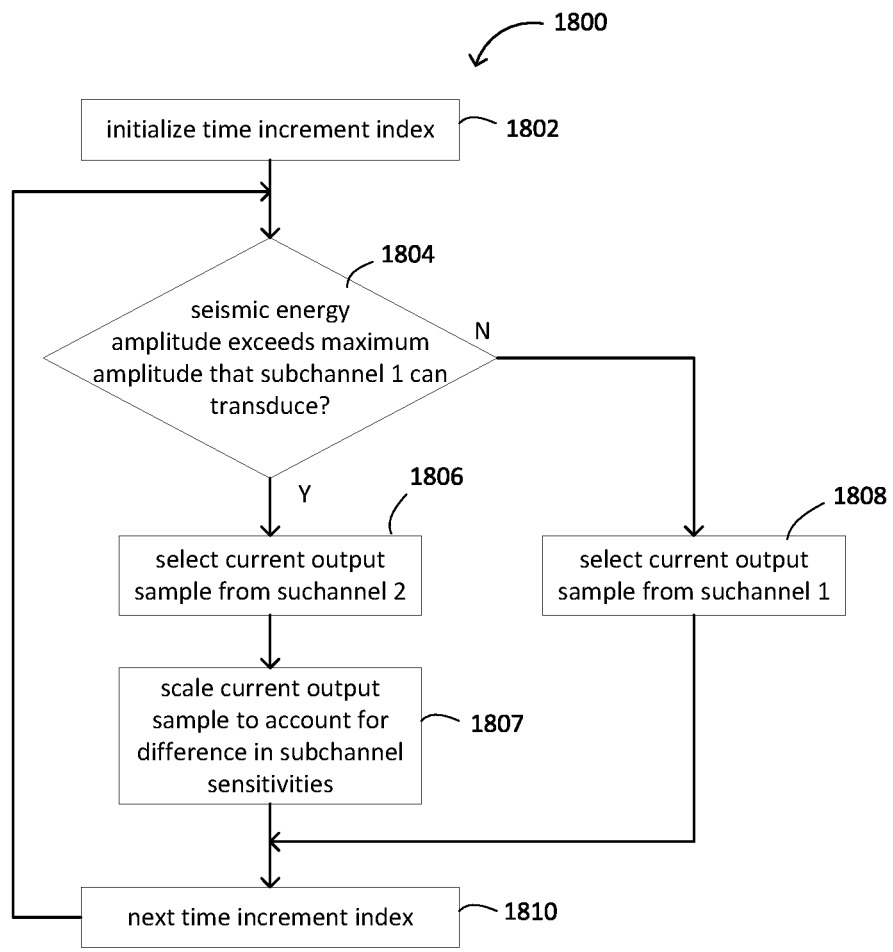
FIGS. 18, 19, and 20 are flow diagrams illustrating example methods for generating the hybrid waveform of FIG. 17 in accordance with embodiments.
Figure 19:
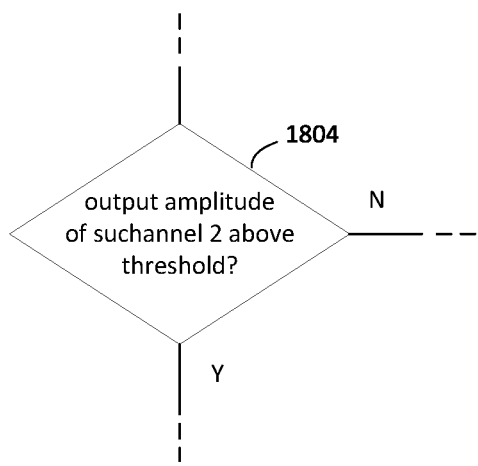
Figure 20:
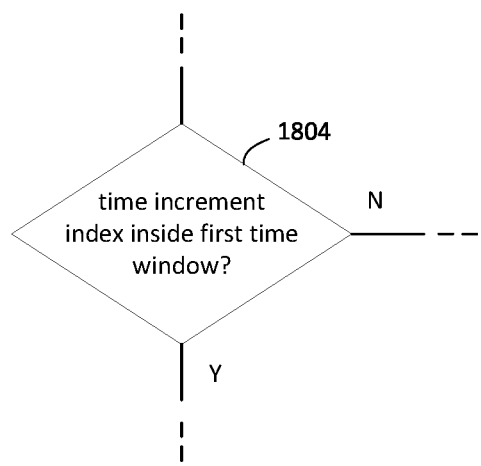

FIGS. 18-20 are flow diagrams illustrating example techniques that may be used in embodiments to generate a hybrid waveform such as waveform 1700. The illustrated functionality may be implemented in any suitable manner. For example, the functionality may be implemented using an application specific integrated circuit ("ASIC") or a field programmable gate array ("FPGA"). The functionality may also be implemented with program instructions executing on a computing device such as any of those to be described further below.

In accordance with the example method 1800 illustrated in FIG. 18, a time increment index may be initialized at step 1802. The time increment index may be used to reference time samples in the waveforms appearing at the outputs of each data acquisition subchannel, such as at the outputs of subchannels 1504 and 1506, as well as to reference time samples in the waveform appearing at the output of subchannel selection unit 1516. In the method illustrated, subchannel 2 is assumed to be capable of transducing seismic energy having a higher maximum amplitude than subchannel 1 is capable of transducing. For example, subchannel 1 referred to in method 1800 may correspond to subchannel 1504 in the embodiment of FIG. 15, and subchannel 2 of method 1800 may correspond to subchannel 1506 in the embodiment of FIG. 15. At step 1804, a determination is made whether incoming seismic energy amplitude exceeds the maximum amplitude that subchannel 1 is capable of transducing. If so, then, at step 1806, the output sample for the current time increment is selected from the output of subchannel 2. But if not, then the output sample for the current time increment is selected from the output of subchannel 1, as shown at step 1808. For samples that are selected from subchannel 2, a suitable scaling factor is applied to the sample at step 1807 to account for the difference in sensitivities between the two subchannels. For example, the sample value may be multiplied by the scaling factor. Thereafter, the time increment index may be incremented, as shown at step 1810, and the process repeated for the next time increment, as indicated by the arrow pointing back to step 1804.

Step 1804 may be implemented in a number of ways. By way of example, FIG. 19 illustrates a class of embodiments in which step 1804 may be implemented by determining whether the output amplitude of subchannel 2 is above a threshold level. The threshold level may be chosen to correspond to the maximum amplitude of seismic energy that can be transduced by subchannel 1, taking the scaling factor into account. In the case of hybrid waveform 1800, for example, the threshold level may be chosen to correspond to +/−2.5 V after scaling, or to an equivalent value out the output of subchannel 2 before scaling. For such embodiments, output samples would be selected from subchannel 2 for any time increment in which the output amplitude of subchannel 2 exceeds+/−2.5 V after scaling. For other time increments, the output samples would be selected from subchannel 1.

By way of further example, as FIG. 20 illustrates, step 1804 may also be implemented based on an elapsed time from a marine seismic source activation. For example, a determination can be made whether the current time increment index falls within time window 1802 of FIG. 18. If so, then the output sample for the current time increment index may be selected from subchannel 2. But if the current time increment index falls within time window 1804 of FIG. 18, the output sample for the current time increment index may be selected from subchannel 1. Other techniques are also possible.

Creating a Reduced Sensitivity Seismic Sensor from a Conventional Seismic Sensor As was mentioned above, a reduced sensitivity seismic sensor may be created by adding suitable attenuation circuitry to a conventional seismic sensor.

Figure 21:
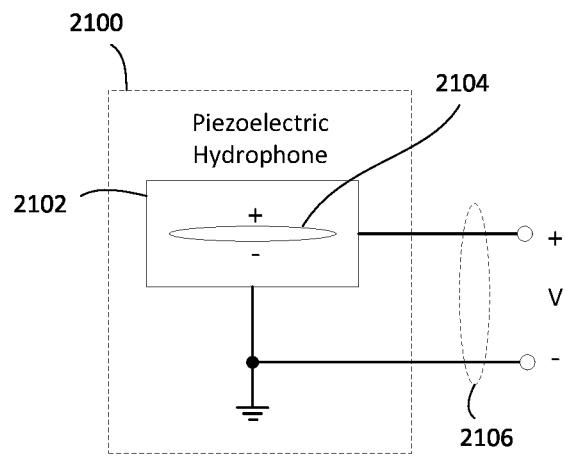
FIGS. 21 and 22 are block diagrams illustrating example techniques, in accordance with embodiments, for creating a reduced sensitivity seismic sensor from a conventional seismic sensor.
Figure 22:
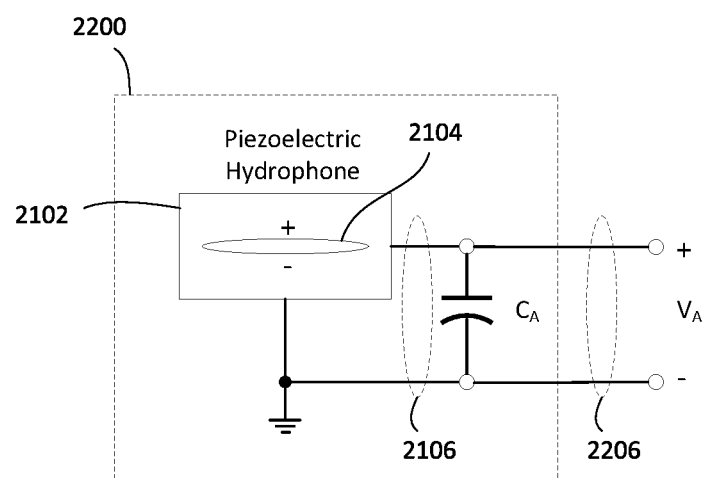

By way of example, FIG. 21 illustrates a conventional seismic sensor 2100 that comprises a piezoelectric hydrophone 2102. FIG. 22 illustrates a reduced sensitivity seismic sensor 2200 that is based on the same type of piezoelectric hydrophone 2102 depicted in FIG. 21. Referring now to FIG. 21, when a piezoelectric hydrophone is in use, the seismic sensor output voltage V follows the relation Q=CV, where Q is the charge produced by the piezoelectric element 2104 inside the hydrophone, C is the dielectric capacitance of piezoelectric element 2104, and V is the output voltage produced across the output port 2106 of the hydrophone.

To create a reduced sensitivity seismic sensor from the embodiment of FIG. 21, a suitable attenuation capacitance $C_A$ may be coupled across the output port of the hydrophone, as shown in FIG. 22. The value of the attenuation capacitance can be chosen to achieve a desired reduction in the sensitivity of the sensor. In particular, adding the attenuation capacitance as shown effectively increases the C value in the above relation because the attenuation capacitance is placed in parallel with the capacitance of the piezoelectric element 2104 of the sensor, such that $C'=C+C_A$, where C' is the effective capacitance of the sensor, C is the capacitance of the piezoelectric element 2104 of the sensor, and $C_A$ is the added attenuation capacitance. Adding the attenuation capacitance does not, however, change the Q value of the piezoelectric element. For this reason, the larger the value of the added attenuation capacitance, the lower the resultant output voltage range that can appear at the output port 2206 of the modified hydrophone sensor, since $V_A=Q/C'$, where $V_A$ is the modified output voltage of the sensor and C' is equal to $C+C_A$. The same technique can be employed to create a reduced sensitivity sensor group—either by adding an attenuation capacitance across the output port of each sensor in the sensor group, or by adding an attenuation capacitance across the output port of the entire sensor group, or both, as appropriate.

In the same manner, an attenuation capacitor may be added to the output of a conventional piezoelectric accelerometer type sensor to reduce its sensitivity, since piezoelectric accelerometer sensor types are also based on the output of a piezoelectric element.

In the case of conventional geophone type sensors, which feature a transducer element that has inductive, resistive, and capacitive properties ("LRC"), a suitable LRC network may be coupled across the output of the conventional sensor to reduce its output in the same way that the attenuation capacitance $C_A$ is shown coupled across the output port of the hydrophone sensor in FIG. 22. In simpler embodiments, the attenuation circuitry coupled to a geophone output may comprise simply a resistor. It is believed, however, that adding an LRC attenuation network to the output of the conventional geophone may better preserve the frequency response exhibited by the reduced sensitivity device, since the transducer in a conventional geophone exhibits an LRC type frequency response. In general, the frequency response characteristics of an unattenuated seismic sensor will be better preserved by using an attenuator circuit that exhibits the same impedance type as does the seismic sensor. Thus, for a sensor having an LRC impedance type, an attenuator circuit having an LRC impedance type will better preserve the frequency response characteristics of the sensor than will an attenuator circuit having a simple R impedance type.

If desired, an attenuation circuit can be physically located inside of a sensor package, or outside of but proximate to the sensor package. For embodiments that operate only within the range of frequencies of interest in marine seismic exploration, however, an attenuation circuit need not be physically located inside of or proximate to the sensor, but may instead be located elsewhere. For example, in such embodiments, an attenuation circuit may be physically located with data acquisition channel electronics that are electrically coupled to (associated with) the sensor but are located remotely from the sensor.

The phrases "attenuator circuit," "attenuator circuitry," and their variants as used herein mean any of the example attenuation techniques just described as well other types of circuitry that, when coupled to a conventional seismic sensor, reduce the sensitivity of the sensor.

Separate Different-Gain Subchannels Coupled to a Single Sensor or Sensor Group

Figure 16:
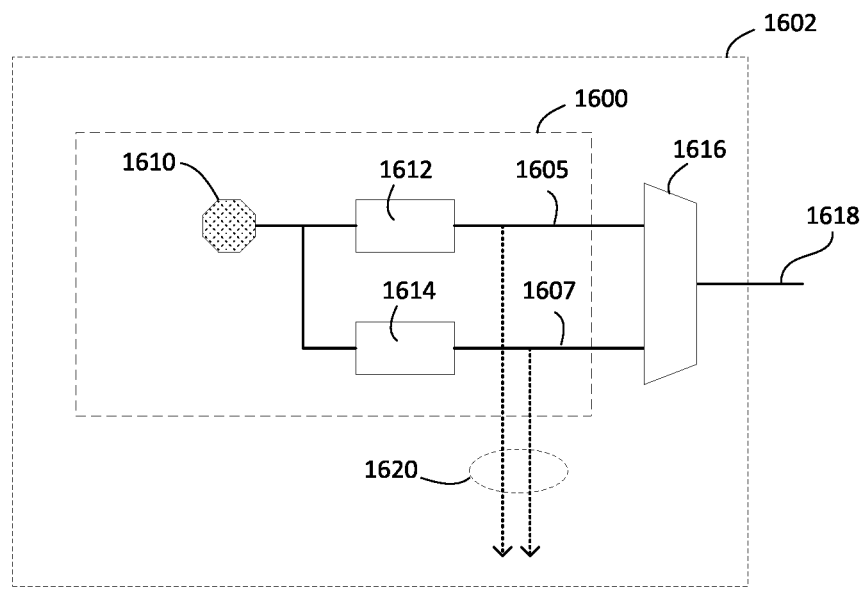
FIG. 16 is a block diagram schematically illustrating a second example class of extended dynamic range data acquisition channels in accordance with embodiments.

FIG. 16 illustrates a second example technique for implementing data acquisition channel 1204. The class of embodiments illustrated in FIG. 16 is based on using separate data acquisition subchannels, each of which is coupled to the same seismic sensor or sensor group. In some, but not necessarily all of such embodiments, the seismic sensor or sensor group to which the subchannels are coupled may be a reduced sensitivity seismic sensor or sensor group. Like the embodiments of FIG. 15, the electronics associated with each subchannel in the embodiments of FIG. 16 may have a fixed gain but, unlike in the embodiments of FIG. 15, each subchannel in the embodiments of FIG. 16 exhibits a different gain than the other subchannel(s). As was the case with the embodiments of FIG. 15, seismic data are gathered by each of the subchannels of FIG. 16 simultaneously, and a hybrid waveform may be constructed from the subchannel outputs—either in real time during the data acquisition itself, or later, during data processing steps that occur after the data have been acquired or after the survey has been completed.

Referring now to FIG. 16, two types of embodiments are shown, labeled 1600 and 1602, respectively. Either type of embodiment, 1600 or 1602, may be used to implement a data acquisition channel 1204 as described above. Like the embodiments of FIG. 15, both of the embodiments of FIG.

16 are formed using two data acquisition subchannels 1612, 1614 having respective subchannel outputs 1605, 1607. Unlike the embodiments of FIG. 15, however, both of the data acquisition subchannels in the embodiments of FIG. 16 are coupled to the same seismic sensor or sensor group 1610. In embodiments that use a reduced sensitivity sensor or sensor group, the reduced sensitivity seismic sensor may be constructed, for example, in accordance with any of the techniques described above. Also unlike the embodiments of FIG. 15, the data acquisition subchannels in the embodiments of FIG. 16 have different gains. In particular, data acquisition subchannel 1612 has a larger gain than does data acquisition subchannel 1614. Accordingly, the maximum seismic energy amplitude that can be transduced by subchannel 1614 is higher than the maximum seismic energy amplitude that can be transduced by subchannel 1612. In further embodiments, the noise floor of subchannel 1614, and thus the minimum amplitude seismic energy amplitude that subchannel 1614 can transduce, may be chosen to be lower than the maximum seismic energy amplitude that subchannel 1612 can transduce. In this way, the range of seismic energy amplitudes that can be transduced by a data acquisition channel constructed in accordance with embodiments 1600 or 1602 will correspond to the range between the maximum seismic energy amplitude that subchannel 1614 can transduce and the minimum seismic energy amplitude that subchannel 1612 can transduce. Thus, such an embodiment will exhibit an extended dynamic range relative to the dynamic range of a conventional marine seismic data acquisition channel that is associated with a conventional marine seismic sensor.

In one example class of embodiments, the sensitivity of reduced sensitivity seismic sensor 1610 may be lower than that of a conventional sensor of the same type by an attenuation factor. In such embodiments, data acquisition subchannel 1612 may be designed to have a gain equal to the value of the attenuation factor, such that the range of seismic energy amplitudes that can be transduced by subchannel 1612 is equivalent to that of a conventional data acquisition channel that is coupled to a conventional sensor of the same type. In such embodiments, data acquisition subchannel 1614 may be designed to have unity gain, such that the maximum seismic energy amplitude that subchannel 1614 can transduce will be higher than the maximum seismic energy amplitude that subchannel 1612 can transduce, by an amount equal to the attenuation factor.

In some embodiments, each of data acquisition subchannels 1612 and 1614 may be implemented using an ADC module having an internal programmable gain, but wherein the internal programmable gain is fixed for the pendency of a given marine seismic survey. Keeping the gains of the acquisition channels fixed throughout a survey improves the quality of the recorded data because doing so eliminates discontinuities that would otherwise by introduced into the data if the gains of the channels were changed while the survey is in progress.

As was the case with the embodiments of FIG. 15, embodiment 1602 may include a subchannel selection unit 1616. In such embodiments, the output of data acquisition channel 1618 may correspond to the output of the subchannel selection unit. Subchannel selection unit 1616 may be implemented in the same manner described above with reference to selection unit 1516, such that it may function to generate a hybrid waveform from the subchannel outputs according to any of the techniques described above. As was also the case with the embodiments of FIG. 15, embodiment 1600 may be designed not to include a subchannel selection unit, if desired. In the latter embodiments, separate outputs 1620 may be provided from each of the data acquisition subchannels, as shown. The separate outputs may be recorded separately and used, for example, in the manner described above with reference to outputs 1520.

Preserving Sensor Frequency Response in Data Acquisition Channels Having Extended Saturation Limits and/or Extended Dynamic Range The frequency response characteristics of a seismic sensor can vary based on numerous factors. One set of such factors relates to the manufacturing processes used to produce the seismic sensors. In the case of piezoelectric hydrophone sensors, for example, the dielectric constant of the piezoelectric element 2104 can vary significantly from one sensor to another due to differences between batches of piezoelectric elements that are produced in the manufacturing process. The thermal stability of the piezoelectric elements can also vary from one sensor to another for the same reasons. Consequently, the frequency response characteristics of two different piezoelectric hydrophones are very unlikely to be the same, regardless of the temperature of the medium in which the two sensor are deployed.

Accordingly, for embodiments constructed in accordance with FIG. 15, some calibration of the data acquisition subchannels may be desirable in order to compensate for differences in the characteristics of the sensors that are associated with each subchannel. Embodiments constructed in accordance with FIG. 16 are advantageous in this regard, however, because, in embodiments constructed in accordance with FIG. 16, all of the subchannels are coupled to a single output of the same seismic sensor or sensor group. In such embodiments, therefore, all of the subchannels will receive the same input signal regardless of the characteristics of the sensor or sensor group that produces the input signal, and regardless of the temperature of the medium in which the sensor or sensor group is deployed. Thus, for embodiments constructed according to FIG. 16, separate calibration or compensation of each individual subchannel may not be necessary.

Another factor that can affect the frequency response of a seismic sensor is the impedance of the load to which the sensor is coupled. That is, the impedance with which the output port of a seismic sensor is terminated can affect the frequency response of the sensor itself. By way of example, consider the case of a seismic sensor operating in a constant temperature environment. As long as the termination impedance of the seismic sensor remains constant, the frequency response of the sensor will also remain substantially constant. But if the termination impedance of the sensor changes, the frequency response of the sensor may also change—even if the operating temperature remains constant. High-impedance seismic sensors, such as piezoelectric hydrophones, can be especially sensitive to this problem.

A class of embodiments similar to those of FIG. 16 will now be described that can be used to address the just-described termination impedance problem effectively, such that extended saturation limits and/or extended dynamic range may be achieved in a data acquisition channel while still preserving the frequency response characteristics of the associated seismic sensor. Before discussing this class of embodiments, however, a brief discussion of input protection circuitry will be instructive.

Input Protection Circuitry

It is desirable in the design of solid state devices to include some form of over-voltage protection circuitry at inputs to the device. Such over-voltage protection circuitry guards against circumstances in which a high voltage presented at an input of the device can permanently damage the device itself by damaging one or more silicon junctions inside it. An over-voltage condition can be presented at an input, for example, by a static electric charge or by excessively high signal levels applied to the input.

Accordingly, an input protection circuit functions to limit the voltage appearing across a protected input to levels at which damage to the protected device is unlikely to occur. Such an input protection circuit can be in an "inactive" state or in an "active" state. Normally, an input protection circuit has little to no effect on an associated input signal as long as the input protection circuit remains in its inactive state. Once the input protection circuit enters its active state, however, it begins to have an effect on the input signal. Specifically, it begins to reduce the amplitude of the input signal relative to a level the signal would otherwise have reached in the absence of the input protection circuit. The phrase "activation voltage" as used herein refers to a voltage level on a protected input at which an input protection circuit coupled to the input transitions from an inactive state to an active state. For example, assume that an input protection is coupled to an input signal. When the voltage level of the input signal remains low (i.e., the input signal exhibits a small positive and/or negative amplitude), the input protection circuit remains inactive. As the voltage level of the input signal increases (i.e., a positive and/or a negative amplitude of the input signal increases), the voltage level of the input signal may reach the activation voltage of the input protection circuit, at which point the input protection circuit transitions from its inactive state to its active state. The activation voltage of an input protection circuit may be specified as a single voltage value (e.g., +2.5V or −2.5V) in the case of a single-ended input protection circuit, or as a pair of voltage values (e.g., +/−2.5V) in the case of a differential input protection circuit. In the latter example, the input protection circuit may be said to be associated with an upper activation voltage (in this example, +2.5V) and a lower activation voltage (in this example, −2.5V).

In most cases, when an input protection circuit is active, the input protection circuit changes not only the amplitude of the input signal, but also the impedance of the protected input itself. For this reason, while it is desirable to include input protection circuitry in an enhanced data acquisition channel according to the embodiments described herein, doing so without more can cause the frequency response characteristics of the data acquisition channel to exhibit undesirable discontinuities corresponding to changes in the state of the input protection circuitry.

In general, input protection circuitry can take a variety of forms, which forms may themselves depend on the requirements of a given application. Most forms of input protection circuitry comprise at least one series resistance and at least one diode. In such circuitry, a resistance is coupled in series between a signal source (e.g., a seismic sensor or sensor group) and an input for which over-voltage protection is desired (e.g., an input of a data acquisition channel), and a diode is coupled between the protected input and a reference node (e.g., a ground node or some other constant-voltage node). Other forms of input protection circuitry may exist as well that do not employ traditional diodes or series resistance, but that nevertheless have the effect of changing the impedance of the protected input when the protection circuitry is activated. Moreover, in the forms of protection circuitry that do employ diodes, the types of diodes employed may vary widely. Some, for example, may employ simple silicon junction diodes, while others may employ Zener diodes, and still others may employ so-called transient voltage suppression ("TVS") diodes. Other variations are also possible.

The terms "input protection circuit," "input protection circuitry," and their variants as used herein refer to any form of over-voltage protection circuit that is coupled to an input of a solid state device and that functions to limit or otherwise reduce the voltage appearing across the protected input to levels at which damage to the protected device is unlikely to occur. The term "activated" and its variants when used herein with reference to an input protection circuit means that the amplitude of an input signal coupled to a protected input has reached a level that equals or exceeds an activation voltage associated with the input protection circuit—that is, the amplitude of the input signal has reached a level that activates the input protection circuit. "Exceeds" in this sense means "more positive than the activation voltage" in the case of a positive activation voltage or "more negative than the activation voltage" in the case of a negative activation voltage. When an input protection circuit has been activated, this typically means, although does not require, that a switching element or some other active element that enables voltage limiting by the input protection circuit has transitioned to a conducting state. The terms "inactive" or "not activated" and their variants as used herein with reference to an input protection circuit mean that the amplitude of an input signal coupled to a protected input is below an activation voltage associated with the input protection circuit—that is, the amplitude of the input signal is at a level such that the input protection circuit is not activated. "Below" in this sense means "less positive than the activation voltage" in the case of a positive activation voltage or "less negative than the activation voltage" in the case of a negative activation voltage. When an input protection circuit has been inactivated or is not active, this typically means, although does not require, that a switching element or some other active element that (when conducting) enables voltage limiting by the input protection circuit is in a non-conducting state.

Figure 23:
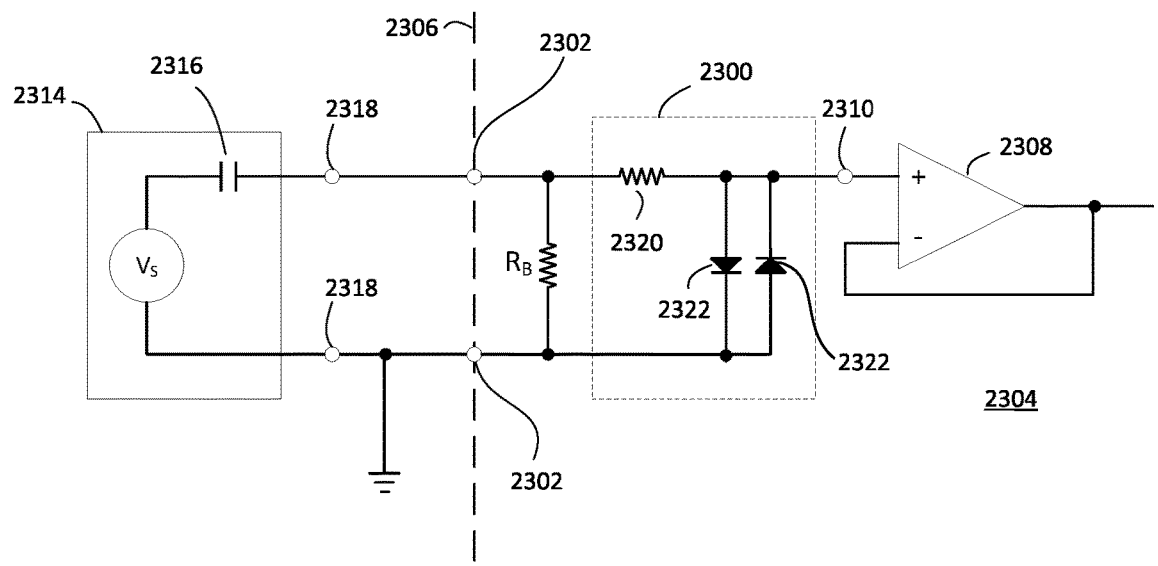
FIGS. 23 and 24 are schematic diagrams illustrating example input protection circuitry in accordance with embodiments.
Figure 24:
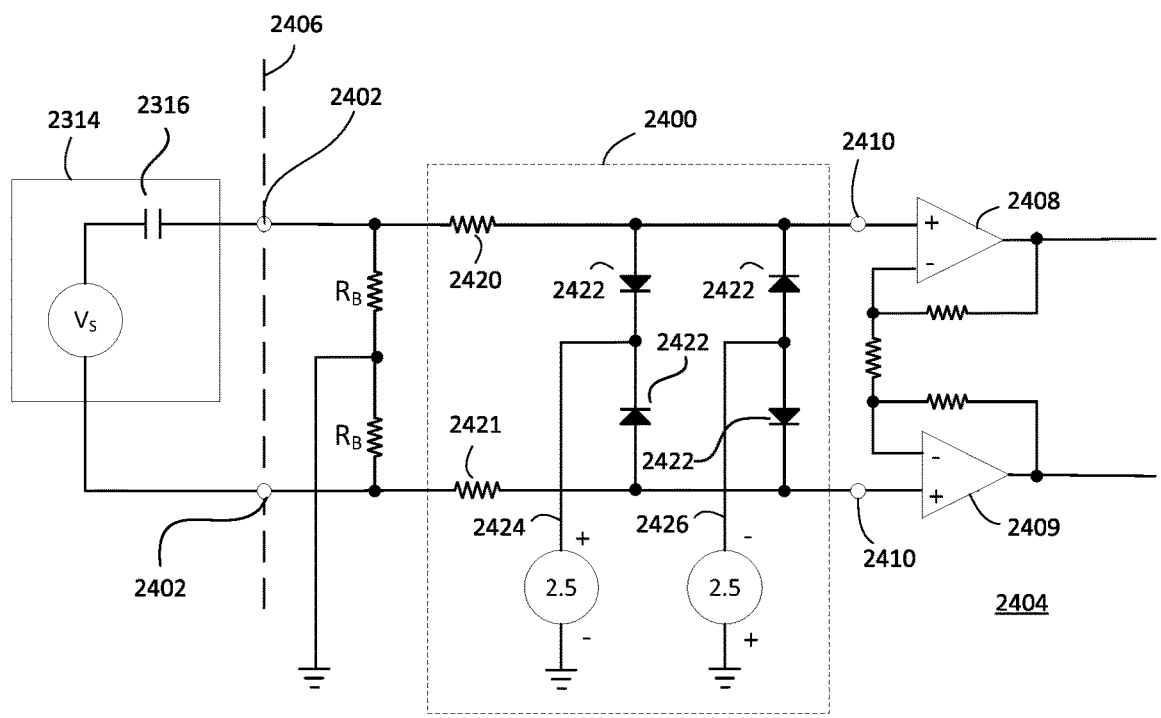

FIGS. 23 and 24 are provided to illustrate how activation of an input protection circuit may change the impedance of an input that it protects, and thus may change the frequency response of a seismic sensor that is coupled to the input. The forms of input protection circuitry illustrated in FIGS. 23 and 24, and the activation voltages associated with them, are provided here only for the sake of explanation. Other forms of input protection circuitry, and other activation voltages, may be used in embodiments as appropriate to the application.

FIG. 23 illustrates a simple form of single-ended input protection circuit 2300 coupled to an input port 2302 of a solid state device 2304. Dashed line 2306 represents the boundary of the solid state device such that the components to the right of dashed line 2306 are internal to the solid state device, while components to the left of the dashed line are external to the solid state device. Assume that, inside of device 2304, input port 2302 is coupled through input protection circuit 2300 to an amplifier 2308 as shown, and that the input impedance of the amplifier as seen toward the right through its input port 2310 is very high—which is typically the case, for example, with operational amplifier circuits. In the example shown, amplifier 2308 is configured to exhibit unity gain. Other gains may also be used. Assume further that an external seismic sensor 2314 having a high output impedance is coupled to input port 2302 as shown. For simplicity, the high output impedance seismic sensor is represented in the drawing with an equivalent circuit comprising an ideal voltage source Vs coupled to the output port 2318 of the sensor through a capacitance 2316. The impedance of the sensor, looking toward the left through the output port 2318 of the sensor, is thus very high. The term "high impedance sensor" as used herein refers to a sensor whose impedance, as seen looking into the sensor through its output port terminals in this manner, is high.

Input protection circuitry 2300 is typical of the forms of input protection circuitry described above in that it includes a resistance 2320 coupled in series with a protected input 2302, and includes one or more diodes 2322 coupled between the protected input and a reference node (ground in this case). When input protection circuit 2300 is not active (in this case, when both of diodes 2322 are in a non-conducting state), the impedance of input 2302 is the same as that of bias resistor RB, because the input impedance of amplifier 2308 is very high. But when input protection circuit 2300 is active (in this case, when one or both of diodes 2322 is in a conducting state), resistor 2320 is effectively placed in parallel with bias resistor RB, and thus the input impedance of input 2302 is lower than it is when the diodes are not in a conducting state. Consequently, when input protection circuitry 2300 transitions from its inactive state to its activate state, the impedance of input 2302 abruptly changes from a relatively high value to a significantly lower value. Moreover, because the frequency response of seismic sensor 2314 is determined by its termination impedance—which, in this case, is the impedance of input 2302—the frequency response of the sensor will change abruptly as well when the state of the input protection circuit changes.

By way of further example, FIG. 24 illustrates a differential input protection circuit 2400 coupled to an input port 2402 of a solid state device 2404. As was the case in FIG. 23, a dashed line 2406 represents the boundary of the solid state device, such that the components to the right of dashed line 2406 are internal to the solid state device, while components to the left of the dashed line are external to the solid state device. The same high impedance seismic sensor 2314 of FIG. 23 is shown coupled to protected input port 2402 in FIG. 24. Protection circuit 2400 is configured to activate at approximately +/−2.5 V by virtue of the connections between reference nodes 2424, 2426, and diodes 2422. Assume, as in the example of FIG. 23, that the input impedance of each of differential amplifiers 2408, 2409 is very high, and thus that the impedance of differential input port 2420 is very high. It follows that, when input protection circuit 2400 is not active (in this case, when all of diodes 2422 are in a non-conducting state), the impedance of input port 2402 is determined by bias resistors RB. But, when input protection circuit 2400 is active (in this case, when one or more of diodes 2422 is in a conducting state), at least one of series resistors 2420, 2421 is effectively placed in parallel with a corresponding one of bias resistors RB. Consequently, when the input protection circuit transitions from its inactive state to its activate state, the impedance of input port 2402 abruptly changes to a lower value relative to the impedance that it exhibited when the input protection circuit was not active. For this reason, and as was the case in the example of FIG. 23, the frequency response of seismic sensor 2314 will also change abruptly when input protection circuit 2400 activates, because activation of the input protection circuit changes the termination impedance of the sensor.

Enhanced Data Acquisition Channels with Preserved Sensor Frequency Response

Figure 25:
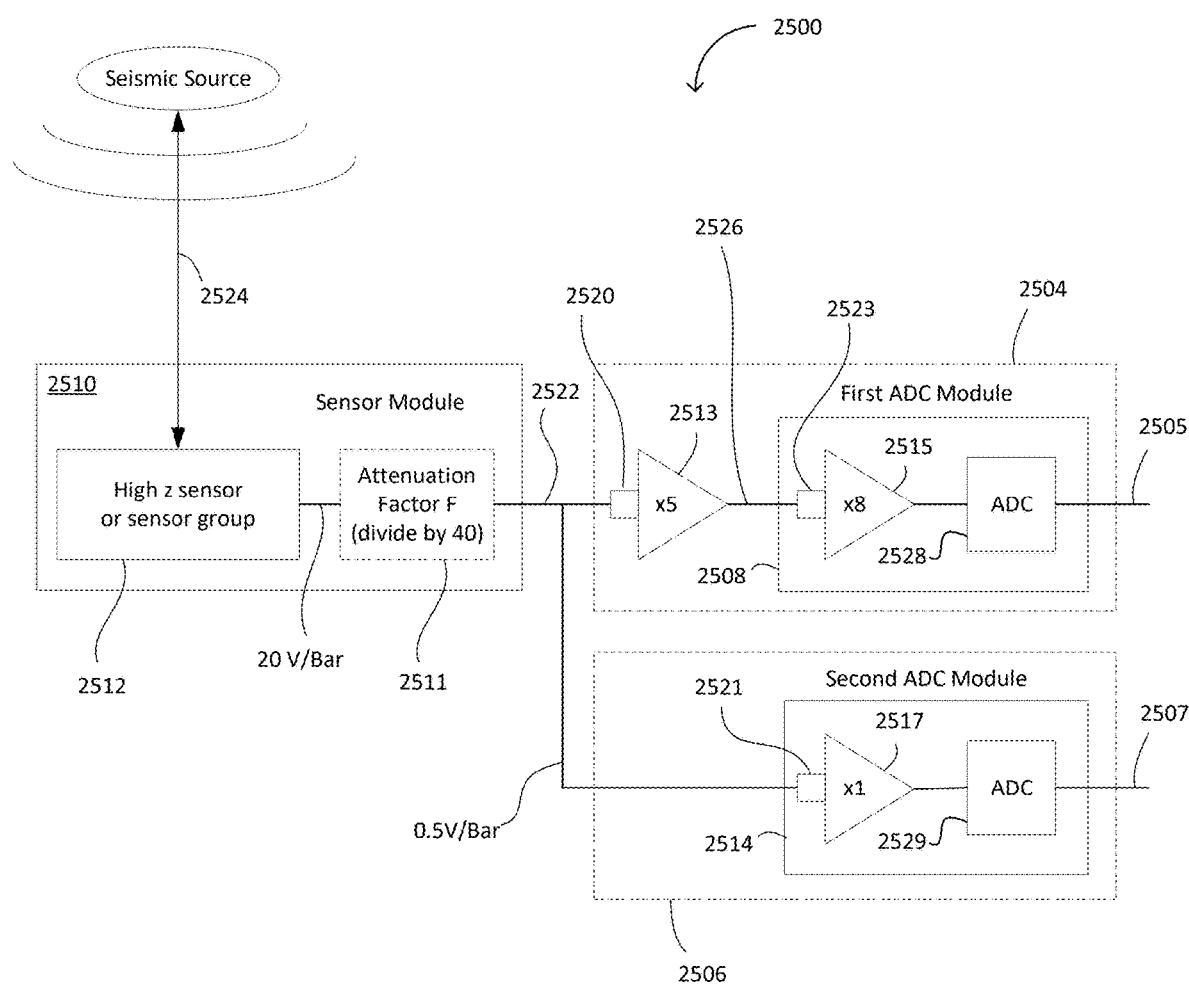
FIG. 25 is a block diagram schematically illustrating a third example class of extended dynamic range data acquisition channels in accordance with embodiments.

FIG. 25 illustrates an example seismic data acquisition channel 2500 that is representative of a class of embodiments that can provide the extended saturation limits and/or the extended dynamic range described above while still preserving the frequency response characteristics of the seismic sensor or sensor group that is associated with the data acquisition channel. While the embodiments of FIG. 25 may have particular utility for use with high-impedance seismic sensors or sensor groups, they can also be used with sensors that do not exhibit high impedance.

In general, embodiments 2500 feature a sensor or sensor module 2510 having an electrical sensor output 2522, and first and second data acquisition subchannels 2504, 2506, each having a respective subchannel input coupled to the sensor module output. The phrase "sensor module" as used herein refers either to a sensor or sensor group alone, or to a sensor or sensor group having other circuitry (such as attenuation circuitry) coupled thereto. Like the embodiments of FIG. 16, each of the data acquisition subchannels in the embodiment of FIG. 25 exhibits a different gain. Subchannel 2504 is designed to provide higher than unity gain and thus includes at least one amplifier, while subchannel 2506 is designed to provide a lower gain than subchannel 2504 and thus need not include an amplifier—although it may include an amplifier if desired. In the illustrated embodiment, the overall gain of subchannel 2504 is provided in two stages. In particular, the overall gain is the product of gains provided by a first amplifier 2513 and by a second amplifier 2515 that follows the first amplifier.

Each of amplifiers 2513, 2515 may serve as an impedance isolator. The phrase "impedance isolator" as used herein refers to any circuit or component having an input and an output and for which a change of impedance coupled to the output has substantially no effect on the impedance of the input. An operational amplifier, for example, exhibits this quality and therefore may serve as an impedance isolator in embodiments. Other types of circuits or components may also be used to provide such an impedance isolation function.

Input protection circuitry 2520, 2521 is disposed at the respective subchannel inputs of the first and second data acquisition subchannels 2504, 2506, as shown. In subchannel 2504, input protection circuit 2520 is coupled between the subchannel input and an input of impedance isolator 2513 (in this case, amplifier 2513). An internal input protection circuit 2523 is coupled to the output of the impedance isolator 2526, as shown. In subchannel 2506, input protection circuit 2521 is coupled to the subchannel input (in this case, between the subchannel input and the input of a unity gain amplifier 2517, as shown).

The sensitivity of sensor module 2510, and the activation voltages of input protection circuits 2520, 2521 are chosen such that neither of input protection circuits 2520, 2521 will activate when seismic energy reaching sensor 2512 has an amplitude less than a first threshold level. Internal input protection circuit 2523 is configured to activate when seismic energy reaching sensor 2512 has an amplitude greater than a second threshold that is lower than the first threshold. Under these conditions, as the amplitude of seismic energy reaching sensor 2512 increases from a low level to a high level, internal input protection circuit 2523 will activate before either of input protection circuits 2520, 2521 activates. Because amplifier 2513 acts as an impedance isolator, however, the frequency response of the sensor module is preserved regardless of the activation state of internal protection circuit 2523, and for as long as neither of input protection circuits 2520, 2521 is activated.

In the illustrated embodiment, sensor module 2510 has a sensitivity that is reduced by an attenuation factor F relative to the sensitivity of a conventional seismic sensor module of the same type. That is, the reduced sensitivity of the sensor module is equal to the sensitivity of sensor 2512 divided by the attenuation factor F. By way of example, for embodiments in which the sensor module is constructed using a hydrophone sensor type, the attenuation factor F might be chosen to be 40, such that the sensitivity of sensor module 2510 becomes approximately 0.5 V/Bar instead of the 20 V/Bar sensitivity of a conventional hydrophone sensor. As was explained above, such a sensor module may be implemented using a sensor that is inherently F times less sensitive than a conventional sensor of the same type, or it may be implemented using a conventional sensor with attenuation circuitry added to the sensor to reduce its sensitivity by the attenuation factor F. The attenuation factor of 40 is used in the drawing only for the sake of explanation. Other attenuation factors may be used in other embodiments.

In embodiments for which sensor or sensor group 2512 has a sensitivity of 20 V/Bar, and in which an attenuation circuit 2511 having an attenuation factor of 40 is coupled to the output of the sensor, the sensor module output 2522 will exhibit a reduced sensitivity of 0.5 V/Bar. In such embodiments, the first threshold level—that is, the activation voltages at which input protection circuits 2520, 2521 are designed to activate—may be set so that they correspond to seismic energy having an amplitude of +/−5 Bar, or +/−2.5 V. (If desired, higher activation voltages may be used, so that activation of input protection circuits 2520, 2521 does not begin before the output of the data acquisition channel has reached one or both of its saturation limits.) Meanwhile, the second threshold level—that is, the activation voltages at which internal input protection circuit 2523 is designed to activate—may be set so that they correspond to seismic energy having an amplitude of +/−0.125 Bar. Assuming a gain of ×5 for amplifier 2513 as in the embodiment shown, the second threshold level would thus correspond to activation voltages of +/−0.3125 V if the internal input protection circuit is disposed at the input of amplifier 2515 as shown, or to activation voltages of +/−2.5 V if the internal input protection circuit were instead disposed at the output of ×8 gain amplifier 2515. (As was the case with input protection circuits 2520, 2521, higher activation voltages may be used for the internal input protection circuit if desired, so that activation of the internal input protection circuit does not begin before the output of the data acquisition channel has reached one or both of its saturation limits.)

In such embodiments, when sensor module 2510 is disposed at a small distance 2524 from a seismic source activation, such as the distance described above in relation to FIG. 9, no voltage limiting will occur at the inputs of either of the first or the second data acquisition subchannels 2504 or 2506 when the direct wave from the source activation passes over sensor 2512—that is, neither of input protection circuits 2520, 2521 will activate in response to the direct wave. For this reason, the frequency response of sensor 2512 will be preserved even during time periods when the direct wave of seismic energy from the source activation passes over the sensor.

In general, for embodiments that employ an attenuation circuit to produce an attenuation factor as described above, the ratio of the gain provided by subchannel 2504 to the gain provided by subchannel 2506 may be designed to be substantially equal to the attenuation factor. In embodiments such as the one illustrated, this is achieved by causing the gain of subchannel 2504 to equal the attenuation factor F, and by causing the gain of subchannel 2506 to equal unity. Thus, in the illustrated embodiment, the sensitivity of subchannel 2504 will be the same as would be the sensitivity of a conventional data acquisition channel that is associate with a sensor having conventional sensitivity, while the sensitivity of subchannel 2506 will be lower than that of subchannel 2504 by an amount equal to the attenuation factor F. Other designs are also possible.

A hybrid waveform can be constructed from outputs 2505 and 2507 in any manner described above, such as by selecting samples from output 2505 for time increments when output 2505 is not saturated and by selecting samples from output 2507 for time increments when output 2505 is saturated. Also as was described above, a scaling factor F may be applied to samples selected from output 2507 to account for the different in sensitivities between the two subchannels.

Each of subchannels 2504, 2506 may include a respective ADC 2528, 2529, as shown. In some embodiments, each ADC may be contained within a respective ADC module, 2508, 2514, that contains an internal amplifier. In still further embodiments, ADC modules 2508, 2514 may be identical modules. In the embodiment shown, ADC module 2508 includes a programmable gain amplifier 2515, and ADC module 2514 includes a programmable gain amplifier 2517. The programmable gain of amplifier 2515 may be fixed at ×8 for at least the duration of a seismic survey, and the programmable gain of amplifier 2517 may be fixed at ×1 for at least the duration of the survey. The gain of amplifier 2513 in the illustrated embodiment may be fixed at ×5 for at least the duration of the survey so that the combined gains of amplifiers 2513 and 2515 equal the attenuation factor F, which is 40 in this example embodiment. In other embodiments, different attenuation factors and different gains may be used.

Noise Considerations

One of the benefits provided by embodiments constructed according to FIG. 25, in which amplifier 2513 is external to ADC module 2508, is that amplifier 2513 may be implemented using exceptionally low noise design techniques that are more typical of high-fidelity audio electronics, while amplifiers 2515 and 2517 may be implemented using conventional ADC modules that are more typical of marine seismic electronics due to their low cost. Amplifiers 2515 and 2517, for example, may be implemented using field effect transistors ("FETs"), while amplifier 2513 may be implemented using bipolar junction transistors ("BJTs"), if desired, to achieve low noise performance. The use of a BJT amplifier to implement first stage amplifier 2513 is particularly appropriate for embodiments in which an attenuation circuit is coupled across the output of a conventional seismic sensor as described above. This is so because BJT amplifiers tend to exhibit a lower input impedance than do FET amplifiers, and because coupling the attenuation circuit to a conventional sensor in the manner described reduces the apparent impedance of the sensor. Thus, the reduced-impedance sensor provides a better impedance match for the input impedance of the BJT amplifier. In such embodiments, the BJT amplifier may be coupled directly to the sensor module output, or to the sensor module output via an input protection circuit.

In any embodiments, it is desirable for the noise characteristics of a seismic data acquisition channel to be such that any noise attributable to the acquisition channel electronics does not limit the minimum seismic signal amplitude that can be detected by the channel. One way of quantifying this is to determine the acoustic noise density of the seismic data acquisition channel itself, as referred to the input of the data acquisition channel. The result of doing so specifies the equivalent acoustic input noise density of the data acquisition channel. In order for the electronics in a data acquisition channel not to limit the minimum seismic signal amplitude that can be detected by the channel, this equivalent acoustic input noise density must be lower than the acoustic noise spectrum level that is already present at the input of the data acquisition channel. The acoustic noise spectrum level present at the input of a seismic data acquisition channel, in turn, is the sum of various components that may include, for example, mechanical vibration noise, flow noise, and environmental acoustic noise.

In an example embodiment constructed according to FIG. 25 that employs a very low noise amplifier stage 2513 in conjunction with an off-the-shelf ADC module 2508, the equivalent acoustic input noise density of the high-sensitivity subchannel (subchannel 2504) can realistically be approximately 54 dB re 1 $\mu P/(Hz)^{1/2}$. In example embodiments constructed according to FIG. 15 that employ off-the-shelf ADC modules, the equivalent acoustic input noise density of the high-sensitivity subchannel (subchannel 1504) can realistically be approximately 50 dB re 1 $\mu P/(Hz)^{1/2}$. Either of these levels is more than sufficient to ensure that the electronics of the data acquisition channel do not limit the minimum seismic signal amplitude detectable by the channel. This is because noise spectrum levels present at data acquisition channel inputs in marine seismic applications typically exceed 54 dB re 1 $\mu P/(Hz)^{1/2}$ by a significant margin.

Methods for Manufacturing a Geophysical Data Product

Figure 26:
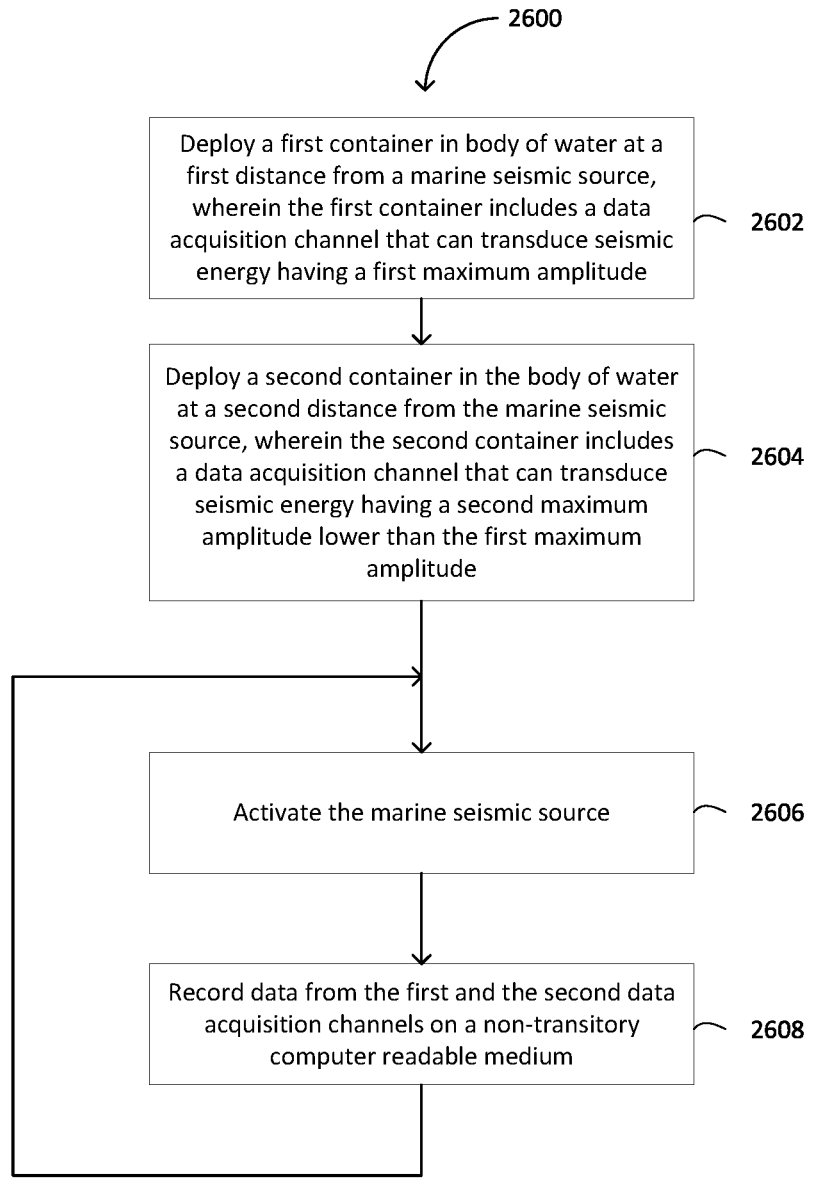
FIG. 26 is a flow diagram illustrating an example method of manufacturing a geophysical data product in accordance with embodiments.

FIG. 26 is a flow diagram illustrating a class of methods 2600 for manufacturing a geophysical data product in accordance with any of the embodiments described herein. In step 2602, a first container is deployed in a body of water at a first distance from a marine seismic source. In step 2604, a second container is deployed in the body of water at a second distance from the marine seismic source. The first container includes at least a first seismic data acquisition channel capable of transducing seismic energy in the body of water having a first maximum amplitude. The second container includes at least a second seismic data acquisition channel capable of transducing seismic energy in the body of water having a second maximum amplitude. The first data acquisition channel is associated with at least a first sensor or sensor group, and the second data acquisition channel is associated with at least a second sensor or sensor group. The first and second sensors or sensor groups correspond to a same sensor type. For example, if the first sensor or sensor group corresponds to a pressure sensor type, then the second sensor or sensor group also corresponds to a pressure sensor type.

The first maximum amplitude is higher than the second maximum amplitude. That is, the saturation limits of the data acquisition channel in the first container are higher than the saturation limits of the data acquisition channel in the second container. The first distance (at which the first container is placed relative to the marine seismic source) is such that seismic energy received from the marine seismic source by the first sensor does not exceed the first maximum amplitude but does exceed the second maximum amplitude (exceeds the saturation limits of the second data acquisition channel but not the saturation limits of the first data acquisition channel). The second distance is such that seismic energy received from the marine seismic source by the second sensor does not exceed the second maximum amplitude (does not exceed the saturation limits of the second data acquisition channel).

In step 2606, the marine seismic source is activated. At step 2608, data from the first data acquisition channel and data from the second data acquisition channel are recorded in at least one non-transitory computer readable medium. The process may then repeated with further activations of the marine seismic source, as indicated by the arrow pointing back to step 2606.

In some embodiments, steps 2602 and 2604 may comprise towing one or more marine seismic streamer sections that include at least the first and the second data acquisition channels. For example, any of the configurations described above with reference to FIGS. 13 and 14 may be employed. In the same or other embodiments, step 2602 may comprise deploying at least a first ocean bottom node that contains at least the first data acquisition channel, and step 2604 may comprise deploying at least a second ocean bottom node that contains at least the second data acquisition channel. Similarly, in the same or other embodiments, steps 2602 and 2604 may comprise deploying an ocean bottom cable system that includes at least the first data acquisition channel in at least one part thereof, and that includes at least the second data acquisition channel in at least another part thereof.

In any embodiments, steps 2602 and 2604 may comprise deploying at least one of the first containers in a direction vertically underneath the seismic source. In the same or other embodiments, at least one of the first containers may be deployed at a location other than vertically underneath the source.

Example Computer System

Figure 27:
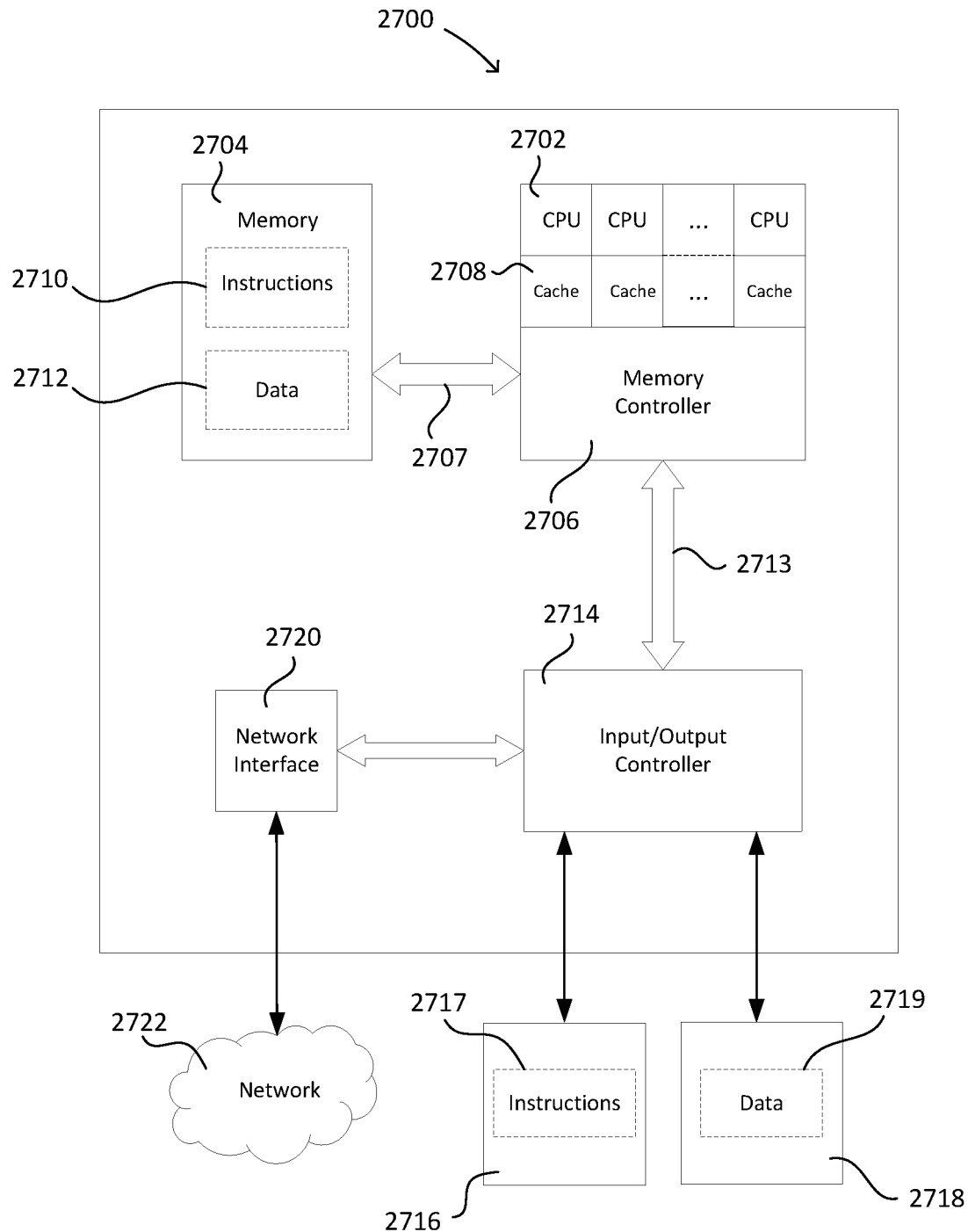
FIG. 27 is a block diagram illustrating an example computing device suitable for use in conjunction with embodiments.

FIG. 27 is a block diagram illustrating an example computer system 2700 that may be used to perform, or that otherwise may be used in conjunction with, any of the methods or techniques described above. A computer system such as computer system 2700 may also be used to produce a computer-readable survey plan that, if followed by navigation and control equipment onboard a survey vessel, causes the vessel to perform any of the methods described above. Computer system 2700 includes one or more central processor unit ("CPU") cores 2702 coupled to a system memory 2704 by a high-speed memory controller 2706 and an associated high-speed memory bus 2707. System memory 2704 typically comprises a large array of random-access memory locations, often housed in multiple dynamic random-access memory ("DRAM") devices, which in turn are housed in one or more dual inline memory module ("DIMM") packages. Each CPU core 2702 is associated with one or more levels of high-speed cache memory 2708, as shown. Each core 2702 can execute computer-readable instructions 2710 stored in system memory 2704, and can thereby perform operations on data 2712, also stored in system memory 2704.

Memory controller 2706 is coupled, via input/output bus 2713, to one or more input/output controllers such as input/output controller 2714. Input/output controller 2714 is in turn coupled to one or more non-transitory computer readable media such as computer-readable medium 2716 and computer-readable medium 2718. Non-limiting examples of such computer-readable media include so-called solid-state disks ("SSDs"), spinning-media magnetic disks, optical disks, flash drives, magnetic tape, and the like. Media 2716, 2718 may be permanently attached to computer system 2700 or may be removable and portable. In the example shown, medium 2716 has instructions 2717 (software) stored therein, while medium 2718 has data 2719 stored therein.

Operating system software executing on computer system 2700 may be employed to enable a variety of functions, including transfer of instructions 2710, 2717 and data 2712, 2719 back and forth between media 2716, 2718 and system memory 2704.

Computer system 2700 may represent a single, standalone computer workstation that is coupled to input/output devices such as a keyboard, pointing device and display. It may also represent one node in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 2700 may represent an access point from which such a cluster or multi-computer system may be accessed and/or controlled. Any of these or their components or variants may be referred to herein as "computing apparatus" or a "computing device."

In example embodiments, data 2719 may correspond to sensor measurements or other data recorded during a marine geophysical survey or may correspond to a survey plan for implementing any of the methods described herein. Instructions 2717 may correspond to algorithms for performing any of the methods described herein, or for producing a computer-readable survey plan for implementing one or more of such methods. In such embodiments, instructions 2717, when executed by one or more computing devices such as one or more of CPU cores 2702, cause the computing device to perform operations described herein on the data, producing results that may be stored in one or more tangible, non-volatile, computer-readable media such as medium 2718. In such embodiments, medium 2718 constitutes a geophysical data product that is manufactured by using the computing device to perform methods described herein and by storing the results in the medium. Geophysical data product 2718 may be stored locally or may be transported to other locations where further processing and analysis of its contents may be performed. If desired, a computer system such as computer system 2700 may be employed to transmit the geophysical data product electronically to other locations via a network interface 2720 and a network 2722 (e.g. the Internet). Upon receipt of the transmission, another geophysical data product may be manufactured at the receiving location by storing contents of the transmission, or processed versions thereof, in another tangible, non-volatile, computer readable medium. Similarly, geophysical data product 2718 may be manufactured by using a local computer system 2700 to access one or more remotely-located computing devices in order to execute instructions 2717 remotely, and then to store results from the computations on a medium 2718 that is attached either to the local computer or to one of the remote computers. The word "medium" as used herein should be construed to include one or more of such media.

EXAMPLE EMBODIMENTS

Example embodiments include at least the following:
1. A method of manufacturing a geophysical data product, comprising:
 deploying a first container in a body of water at a first distance from a marine seismic source, wherein the first container includes at least a first seismic data acquisition channel associated with a first sensor and capable of transducing seismic energy in the body of water having a first maximum amplitude;
 deploying a second container in the body of water at a second distance from the marine seismic source greater than the first distance, wherein the second container includes at least a second seismic data acquisition channel associated with a second sensor and capable of transducing seismic energy in the body of water having a second maximum amplitude;
 wherein the first sensor and the second sensor correspond to a same sensor type, and the first maximum amplitude is higher than the second maximum amplitude;
 wherein the first distance is such that seismic energy received from the marine seismic source by the first sensor does not exceed the first maximum amplitude but does exceed the second maximum amplitude, and the second distance is such that seismic energy received from the marine seismic source by the second sensor does not exceed the second maximum amplitude;
 activating the marine seismic source; and
 recording, on a non-transitory computer readable medium, data from the first seismic data acquisition channel and data from the second seismic data acquisition channel, thereby completing the manufacture of the geophysical data product.
2. The method of embodiment 1, wherein:
 deploying the first container and deploying the second container comprise towing a seismic streamer that includes at least the first seismic data acquisition channel and the second seismic data acquisition channel.
3. The method of embodiment 1, wherein:
 deploying the first container comprises deploying a first ocean bottom node that includes at least the first seismic data acquisition channel; and
 deploying the second container comprises deploying a second ocean bottom node that includes at least the second seismic data acquisition channel.
4. The method of embodiment 1, wherein:
 deploying the first container and deploying the second container comprise deploying an ocean bottom cable system that includes at least the first seismic data acquisition channel and the second seismic data acquisition channel.
5. The method of any of embodiments 1 to 3, wherein:
 deploying the first container comprises disposing the first container in a direction vertically underneath the marine seismic source.
6. A marine seismic data acquisition system, comprising:
 a first container deployable in a body of water, the first container including at least a first seismic data acquisition channel associated with a first sensor and capable of transducing seismic energy in the body of water having a first maximum amplitude; and
 a second container deployable in the body of water, the second container including at least a second seismic data acquisition channel associated with a second sensor and capable of transducing seismic energy in the body of water having a second maximum amplitude;
 wherein the first sensor and the second sensor correspond to a same sensor type; and
 wherein the first maximum amplitude is higher than the second maximum amplitude.
7. The system of embodiment 6, wherein:
 the first container is disposed in the body of water at a first distance from a marine seismic source, wherein the first distance is such that seismic energy received by the first sensor responsive to an activation of the marine seismic source does not exceed the first maximum amplitude but does exceed the second maximum amplitude; and the second container is disposed in the body of water at a second distance from the marine seismic source greater than the first distance, wherein the second distance is such that seismic energy received by the second sensor responsive to the activation of the marine seismic source does not exceed the second maximum amplitude.

8. The system of embodiments 6 or 7, wherein:
the first container is disposed in a direction vertically underneath the marine seismic source.

9. The system of any of embodiments 6 to 8, wherein:
the sensor type is a pressure sensor type.

10. The system of embodiment 9, wherein:
the pressure sensor type is a piezoelectric hydrophone sensor type.

11. The system of any of embodiments 6 to 10, wherein:
the first container comprises a first seismic streamer section; and
the second container comprises a second seismic streamer section.

12. The system of embodiment 11, wherein:
the first seismic streamer section and the second seismic streamer section are configured to be coupled to one another.

13. The system of any of embodiments 6 to 10, wherein:
the first container comprises a first ocean bottom node; and
the second container comprises a second ocean bottom node.

14. The system of any of embodiments 6 to 10, wherein:
the first container comprises a first portion of an ocean bottom cable system; and
the second container comprises a second portion of the ocean bottom cable system.

15. The system of any of embodiments 6 to 14, wherein the first data acquisition channel comprises:
first and second subchannels, wherein the first subchannel is capable of transducing seismic energy having the second maximum amplitude, and the second subchannel is capable of transducing seismic energy having the first maximum amplitude.

16. The system of claim 15, wherein:
each of the first and second subchannels is associated with at least one sensor that is distinct from a sensor associated with the other subchannel; and
the at least one sensor associated with the second subchannel has lower sensitivity than does the at least one sensor associated with the first subchannel.

17. The system of claim 15, wherein:
the first sensor has lower sensitivity than the second sensor;
each of the first and second subchannels is coupled to an output of the first sensor; and
the first subchannel has a larger gain than the second subchannel.

18. The system of any of embodiments 15 to 17, further comprising:
a subchannel selection unit configured to produce a stream of output samples such that each of the output samples is selected from one or the other of the first and second subchannels.

19. The system of embodiment 18, wherein:
the subchannel selection unit is configured to make sample selections based on an output amplitude of at least one of the first subchannel and the second subchannel.

20. The system of embodiment 18, wherein:
the subchannel selection unit is configured to make sample selections based on elapsed time from a marine seismic source activation.

21. Marine seismic data acquisition apparatus, comprising:
a sensor having an electrical sensor output and configured to sense seismic energy in a body of water;
a first data acquisition subchannel configured to exhibit a first gain and comprising a first subchannel input, a first input protection circuit, an impedance isolator, and an internal input protection circuit, wherein the first subchannel input is coupled to the sensor output, the first input protection circuit is coupled between the first subchannel input and an input of the impedance isolator, and the internal input protection circuit is coupled to an output of the impedance isolator; and
a second data acquisition subchannel configured to exhibit a second gain lower than the first gain and comprising a second subchannel input and a second input protection circuit, wherein the second subchannel input is coupled to the sensor output and to the second input protection circuit;
wherein the sensor output and the first and second input protection circuits are configured such that neither the first input protection circuit nor the second input protection circuit will activate when seismic energy reaching the sensor has a peak amplitude less than a first threshold level;
wherein the internal input protection circuit is configured to activate when seismic energy reaching the sensor has a peak amplitude greater than a second threshold level; and
wherein the second threshold level is lower than the first threshold level.

22. The apparatus of embodiment 21, wherein:
the first threshold level is approximately +/−5 Bar.

23. The apparatus of any of embodiments 22, wherein:
the second threshold level is approximately +/−0.125 Bar.

24. The apparatus of embodiment 21, wherein:
the second threshold level is approximately +/−0.125 Bar.

25. The apparatus of any of embodiments 21 to 24, wherein:
the impedance isolator comprises an amplifier.

26. The apparatus of any of embodiments 21 to 25:
wherein the sensor is such that the sensor output would exhibit a first sensitivity if the sensor output were not coupled to other circuitry; and
further comprising an attenuator circuit coupled to the sensor output such that the sensor output exhibits a second sensitivity lower than the first sensitivity.

27. The apparatus of embodiment 26, wherein:
the second sensitivity is equal to the first sensitivity divided by an attenuation factor; and
a ratio of the first gain to the second gain is substantially equal to the attenuation factor.

28. The apparatus of embodiment 27, wherein:
the attenuation factor is substantially equal to 40.

29. The apparatus of any of embodiments 27, wherein:
the first gain is substantially equal to the attenuation factor; and
the second gain is substantially equal to unity.

30. The apparatus of embodiment 29, wherein:
the attenuation factor is substantially equal to 40.

31. The apparatus of any of embodiments 26 to 30, wherein:
the sensor is such that it exhibits a first impedance when not coupled to other circuitry and exhibits a second impedance, lower than the first impedance, when coupled to the attenuator circuit; and
the first gain is provided by an amplifier having at least a first stage that is implemented using bipolar junction transistors.

32. The apparatus of any of embodiments 26 to 31, wherein:
the sensor comprises a piezoelectric sensor; and
the attenuator circuit comprises a capacitor coupled across an output port of the piezoelectric sensor.

33. The apparatus of embodiment 32, wherein:
the sensor comprises a piezoelectric hydrophone.

34. The apparatus of any of embodiments 26 to 33, wherein:
at least a portion of the first gain is provided by an amplifier that comprises one or more bipolar junction transistors.

35. The apparatus of any of embodiments 21 to 34, wherein:
a first subchannel output of the first data acquisition subchannel comprises an output of a first analog to digital converter ("ADC") module; and
a second subchannel output of the second data acquisition subchannel comprises an output of a second "ADC" module.

36. The apparatus of embodiment 35, further comprising:
a selector circuit configured to produce a hybrid waveform at an output thereof by selecting samples from one or the other of the first subchannel output and the second subchannel output, and by applying a scaling factor to samples that are selected from the second subchannel output.

37. The apparatus of any of embodiments 21 to 36, wherein:
the first input protection circuit and the second input protection circuit are configured to activate at a same upper activation voltage and a same lower activation voltage.

38. Marine seismic data acquisition apparatus, comprising:
a seismic sensor module configured to provide a continuously varying electrical sensor module signal on a sensor module output node, representing an amplitude of a continuously varying physical quantity measurable in a body of water by the seismic sensor module;
a first data acquisition subchannel having a first subchannel input coupled to the sensor module output node and having a first subchannel output configured to represent an amplitude of the sensor module signal multiplied by a first subchannel gain, wherein the first subchannel gain is greater than unity and is provided by an amplifier, and wherein maximum and minimum values of the first subchannel output correspond to a first amplitude range of the continuously varying physical quantity that can be transduced by the first data acquisition subchannel; and
a second data acquisition subchannel having a second subchannel input coupled to the sensor module output node and having a second subchannel output configured to represent the amplitude of the sensor module signal multiplied by a second subchannel gain less than the first subchannel gain, wherein maximum and minimum values of the second subchannel output correspond to a second amplitude range of the continuously varying physical quantity that can be transduced by the second data acquisition subchannel; wherein:
the first data acquisition subchannel comprises a first input protection circuit coupled between the first subchannel input and an input of the amplifier, and comprises an internal input protection circuit coupled between an output of the amplifier and another node in the first data acquisition subchannel;
the second data acquisition subchannel comprises a second input protection circuit coupled between the second subchannel input and another node in the second data acquisition subchannel;
the first input protection circuit and the second input protection circuit are both configured to activate at an upper input activation voltage and a lower input activation voltage;
the internal input protection circuit is configured to activate at an upper internal activation voltage and a lower internal activation voltage;
upper and lower limits of the second amplitude range, and the maximum and minimum values of the second subchannel output, correspond to the upper input activation voltage and to the lower input activation voltage, respectively; and
upper and lower limits of the first amplitude range, and the maximum and minimum values of the first subchannel output, correspond to the upper internal activation voltage and the lower internal activation voltage, respectively.

39. The apparatus of embodiment 38, wherein:
a sensitivity of the sensor module signal, and the upper input activation voltage and the lower input activation voltage, are such that a pressure wave in the body of water having an amplitude up to 5 Bar will activate neither the first input protection circuit nor the second input protection circuit.

40. The apparatus of any of embodiments 38 to 39, wherein:
the sensitivity of the sensor module signal, and the upper internal activation voltage and the lower internal activation voltage, are such that a pressure wave in the body of water having an amplitude greater than 0.125 Bar will activate the internal input protection circuit.

41. The apparatus of any of embodiments 38 to 40, wherein the seismic sensor module comprises:
a seismic sensor configured to provide a continuously varying electrical sensor signal on a sensor output node such that, if the sensor output node were not coupled to other circuitry, an amplitude of the sensor signal would represent the amplitude of the continuously varying physical quantity with a first sensitivity; and
an attenuator circuit coupled to the sensor output node and configured to produce a continuously varying electrical attenuated sensor signal on an attenuator output node, such that the attenuated sensor signal represents the amplitude of the continuously varying physical quantity with a second sensitivity lower than the first sensitivity.

42. The apparatus of embodiment 41, wherein:
the sensor output node, the attenuator output node, and the sensor module output node, are the same node.

43. The apparatus of any of embodiments 38 to 42, wherein:
the second sensitivity is equal to the first sensitivity divided by an attenuation factor;
the second subchannel exhibits unity gain; and
the first subchannel gain is equal to the attenuation factor.

44. The apparatus of embodiment 43, wherein:
the attenuation factor and the first subchannel gain are both equal to approximately 40.

45. The apparatus of any of embodiments 38 to 44, wherein:
the seismic sensor exhibits a first impedance when not coupled to other circuitry and exhibits a second impedance, lower than the first impedance, when coupled to the attenuator circuit; and
the amplifier comprises at least a first stage that is implemented using bipolar junction transistors.

46. The apparatus of any of embodiments 38 to 45, wherein:
the amplifier comprises a second stage that follows the first stage; and
the first subchannel gain equals a product of gains provided by the first stage and the second stage.

47. The apparatus of embodiment 46, wherein:
the internal input protection circuit is coupled between an output of the first stage and an input of the second stage.

48. The apparatus of any of embodiments 46 to 47, wherein:
the first subchannel output comprises an output of a first analog to digital converter ("ADC") module;
the second subchannel output comprises an output of a second ADC module; and
the second stage is implemented using an ADC module amplifier that is internal to the ADC module.

49. The apparatus of any of embodiments 38 to 49, wherein:
the first subchannel output comprises an output of a first analog to digital converter module; and
the second subchannel output comprises an output of a second analog to digital converter module.

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

The invention claimed is:

1. Marine seismic data acquisition apparatus, comprising:
a sensor having an electrical sensor output and configured to sense seismic energy in a body of water;
a first data acquisition subchannel configured to exhibit a first gain and comprising a first subchannel input, a first input protection circuit, an impedance isolator, and an internal input protection circuit, wherein the first subchannel input is coupled to the sensor output, the first input protection circuit is coupled between the first subchannel input and an input of the impedance isolator, and the internal input protection circuit is coupled to an output of the impedance isolator; and
a second data acquisition subchannel configured to exhibit a second gain lower than the first gain and comprising a second subchannel input and a second input protection circuit, wherein the second subchannel input is coupled to the sensor output and to the second input protection circuit;
wherein the sensor output and the first and second input protection circuits are configured such that neither the first input protection circuit nor the second input protection circuit will activate when seismic energy reaching the sensor has a peak amplitude less than a first threshold level;
wherein the internal input protection circuit is configured to activate when seismic energy reaching the sensor has a peak amplitude greater than a second threshold level; and
wherein the second threshold level is lower than the first threshold level.

2. The apparatus of claim 1, wherein:
the first threshold level is approximately +/−5 Bar.

3. The apparatus of claim 2, wherein:
the second threshold level is approximately +/−0.125 Bar.

4. The apparatus of claim 1, wherein:
the second threshold level is approximately +/−0.125 Bar.

5. The apparatus of claim 1, wherein:
the impedance isolator comprises an amplifier.

6. The apparatus of claim 1:
wherein the sensor is such that the sensor output would exhibit a first sensitivity if the sensor output were not coupled to other circuitry; and
further comprising an attenuator circuit coupled to the sensor output such that the sensor output exhibits a second sensitivity lower than the first sensitivity.

7. The apparatus of claim 6, wherein:
the second sensitivity is equal to the first sensitivity divided by an attenuation factor; and
a ratio of the first gain to the second gain is substantially equal to the attenuation factor.

8. The apparatus of claim 7, wherein:
the attenuation factor is substantially equal to 40.

9. The apparatus of claim 7, wherein:
the first gain is substantially equal to the attenuation factor; and
the second gain is substantially equal to unity.

10. The apparatus of claim 9, wherein:
the attenuation factor is substantially equal to 40.

11. The apparatus of claim 6, wherein:
the sensor is such that it exhibits a first impedance when not coupled to other circuitry and exhibits a second impedance, lower than the first impedance, when coupled to the attenuator circuit; and
the first gain is provided by an amplifier having at least a first stage that is implemented using bipolar junction transistors.

12. The apparatus of claim 6, wherein:
the sensor comprises a piezoelectric sensor; and
the attenuator circuit comprises a capacitor coupled across an output port of the piezoelectric sensor.

13. The apparatus of claim 12, wherein:
the sensor comprises a piezoelectric hydrophone.

14. The apparatus of claim 6, wherein:
at least a portion of the first gain is provided by an amplifier that comprises one or more bipolar junction transistors.

15. The apparatus of claim 1, wherein:
a first subchannel output of the first data acquisition subchannel comprises an output of a first analog to digital converter ("ADC") module; and
a second subchannel output of the second data acquisition subchannel comprises an output of a second "ADC" module.

16. The apparatus of claim 15, further comprising:
a selector circuit configured to produce a hybrid waveform at an output thereof by selecting samples from one or the other of the first subchannel output and the second subchannel output, and by applying a scaling factor to samples that are selected from the second subchannel output.

17. The apparatus of claim 1, wherein:
the first input protection circuit and the second input protection circuit are configured to activate at a same upper activation voltage and a same lower activation voltage.

\* \* \* \* \*